United States Patent [19]
Okada et al.

[11] Patent Number: 5,642,024
[45] Date of Patent: Jun. 24, 1997

[54] POSITIONING APPARATUS AND METHOD WITH VIRTUAL TRANSMISSION

[75] Inventors: Misako Okada; Makoto Nishimura; Hidehiko Matsumoto; Yuko Tomita; Yasuharu Kudo, all of Aichi, Japan

[73] Assignees: Mitsubishi Denki Kabushiki Kaisha; Mitsubishi Electric Engineering Co., Ltd., both of Tokyo, Japan

[21] Appl. No.: 379,740

[22] Filed: Jan. 27, 1995

[30] Foreign Application Priority Data

Jan. 28, 1994 [JP] Japan ............................ 6-008867

[51] Int. Cl.⁶ ............................................. G05B 11/32
[52] U.S. Cl. ........................ 318/625; 318/568.1; 318/85
[58] Field of Search ................................ 318/625, 560, 318/568.1, 567, 568.11, 568.23, 34–38, 41, 85, 111–113; 364/146–147, 188–190, 167.01; 395/500, 650

[56] References Cited

U.S. PATENT DOCUMENTS

| | | | |
|---|---|---|---|
| 4,568,866 | 2/1986 | Floro et al. | 318/696 |
| 4,663,704 | 5/1987 | Jones et al. | 364/188 |
| 4,771,374 | 9/1988 | Ropelato | 364/147 X |
| 4,901,221 | 2/1990 | Kodosky | 364/200 |
| 4,949,253 | 8/1990 | Chigira et al. | 364/200 |
| 4,972,186 | 11/1990 | Morris | 318/661 X |
| 4,982,358 | 1/1991 | Tanaka et al. | 364/147 X |
| 5,097,405 | 3/1992 | Sato | 364/147 X |
| 5,168,441 | 12/1992 | Onarheim et al. | 364/146 |
| 5,177,420 | 1/1993 | Wada et al. | 318/568.1 X |
| 5,187,788 | 2/1993 | Marmelstein | 395/600 X |

FOREIGN PATENT DOCUMENTS 421107   1/1992   Japan ........................ G05D 3/12

*Primary Examiner*—David S. Martin
*Attorney, Agent, or Firm*—Sughrue, Mion, Zinn, Macpeak & Seas

[57] ABSTRACT

A positioning apparatus and method for synchronously controlling a plurality of motors, such as servo motors, and exercises synchronous control by means of only motors without using any mechanisms, such as coupling shafts, clutches, gears and cams. A controller has a virtual drive capability which provides a virtual cam and virtual clutch capability on the basis of stored values, permitting continuous and repeated operation of a single cycle of positioning with respect to changes in input axis position address data without recalculation of command addresses in real time.

19 Claims, 28 Drawing Sheets

FIG. 2

| | | |
|---|---|---|
| MODULE NUMBER | | ~550 |
| CONNECTION INFORMATION | | ~551 |
| AUXILIARY INPUT AXIS CONNECTION INFORMATION | NO | ~552 |
| ARITHMETIC EXPRESSION | $y(n)=g(n)+y(n-1)$ | ~553 |
| VARIABLE | VARIABLE MEMORY ADDRESS AT WHICH VIRTUAL CLUTCH MODULE ON/OFF COMMAND INFORMATION IS STORED | ~554a |
| | VARIABLE MEMORY ADDRESS AT WHICH VIRTUAL CLUTCH MODULE ON COMMAND ADDRESSES ARE STORED | ~554b |
| | VARIABLE MEMORY ADDRESS AT WHICH VIRTUAL CLUTCH MODULE OFF COMMAND ADDRESSES ARE STORED | ~554c |
| PARAMETER | NUMBER OF INPUT AXIS ONE-REVOLUTION PULSES: N | ~555 |

FIG. 3

| | |
|---|---|
| PRECEDING INPUT AXIS POSITION ADDRESS DATA VALUE: $x(n-1)$ | ~556 |
| CURRENT INPUT AXIS POSITION ADDRESS DATA VALUE: $x(n)$ | ~557 |
| PRECEDING OUTPUT AXIS POSITION ADDRESS DATA VALUE: $y(n)$ | ~558 |
| CURRENT OUTPUT AXIS POSITION ADDRESS DATA VALUE: $y(n-1)$ | ~559 |
| CURRENT INPUT AXIS WITHIN-ONE-REVOLUTION ADDRESS DATA VALUE: $xa(n)$ | ~560 |
| PRECEDING VIRTUAL CLUTCH MODULE STATUS VALUE: $h0$ | ~561 |
| VIRTUAL CLUTCH MODULE ON/OFF COMMAND: $h1$ | ~562 |
| VIRTUAL CLUTCH MODULE ON COMMAND ADDRESS: $h2$ | ~563 |
| VIRTUAL CLUTCH MODULE OFF COMMAND ADDRESS: $h3$ | ~564 |

| MODULE NUMBER | | 610 |
| --- | --- | --- |
| CONNECTION INFORMATION | | 611 |
| AUXILIARY INPUT AXIS CONNECTION INFORMATION | | 612 |
| ARITHMETIC EXPRESSION | $A = x + z$<br>$D = D1 + (D2 - D1) \times \{(A - A1)/(A2 - A1)\}$<br>$y = h \times D$ | 613 |
| VARIABLE | STROKE SET VALUE: $h$ | 614 |

| | 1 | 2 |
|---|---|---|
| 0° | 0 | 0 |
| ⋮ | ⋮ | ⋮ |
| 180° | | 1 |
| ⋮ | 1 | ⋮ |
| 359° | 0 | 0 |

| | | |
|---|---|---|
| LIMIT SWITCH OUTPUT USE/NON-USE | USE | ~754 |
| OPERATION MODE | CAM SHAFT WITHIN-ONE-REVOLUTION CURRENT VALUE MODE | ~755 |
| LIMIT SWITCH OUTPUT ON/OFF POINT ADDRESS | 0 | ~757 |
| | POINT 1 ADDRESS | |
| | POINT 2 ADDRESS | ~758 ~756 |
| | ⋮ | |
| | POINT n ADDRESS | |
| | NUMBER OF ONE-REVOLUTION PULSES | ~759 |
| LIMIT SWITCH OUTPUT ON/OFF PATTERN | INTERVAL 0 OUTPUT PATTERN | |
| | INTERVAL 1 OUTPUT PATTERN | |
| | INTERVAL 2 OUTPUT PATTERN | ~760 |
| | ⋮ | |
| | INTERVAL n-1 OUTPUT PATTERN | |
| | INTERVAL n OUTPUT PATTERN | |
| NUMBER OF VIRTUAL CAM SHAFT ONE-REVOLUTION PULSES | | ~761 |

PRIOR ART

FIG. 25

| MODULE NUMBER | | ~550 |
|---|---|---|
| CONNECTION INFORMATION | | ~551 |
| AUXILIARY INPUT AXIS CONNECTION INFORMATION | NO | ~552 |
| ARITHMETIC EXPRESSION | $y(n) = (x(n) - x(n-1)) \times h + y(n-1)$ | ~570 |
| VARIABLE | NO | ~571 |
| PARAMETER 1 | VIRTUAL CLUTCH MODULE ON ADDRESS: ADD ON | ~572 |
| PARAMETER 2 | VIRTUAL CLUTCH MODULE OFF ADDRESS: ADD OFF | ~573 |

PRIOR ART

FIG. 26

| | |
|---|---|
| PRECEDING INPUT AXIS POSITION ADDRESS DATA VALUE: $x(n-1)$ | ~574 |
| CURRENT INPUT AXIS POSITION ADDRESS DATA VALUE: $x(n)$ | ~575 |
| PRECEDING OUTPUT AXIS POSITION ADDRESS DATA VALUE: $y(n-1)$ | ~576 |
| CURRENT OUTPUT AXIS POSITION ADDRESS DATA VALUE: $y(n)$ | ~577 |
| VIRTUAL CLUTCH MODULE ON/OFF COMMAND: $h$ (ON: 1) (OFF: 0) | ~578 |

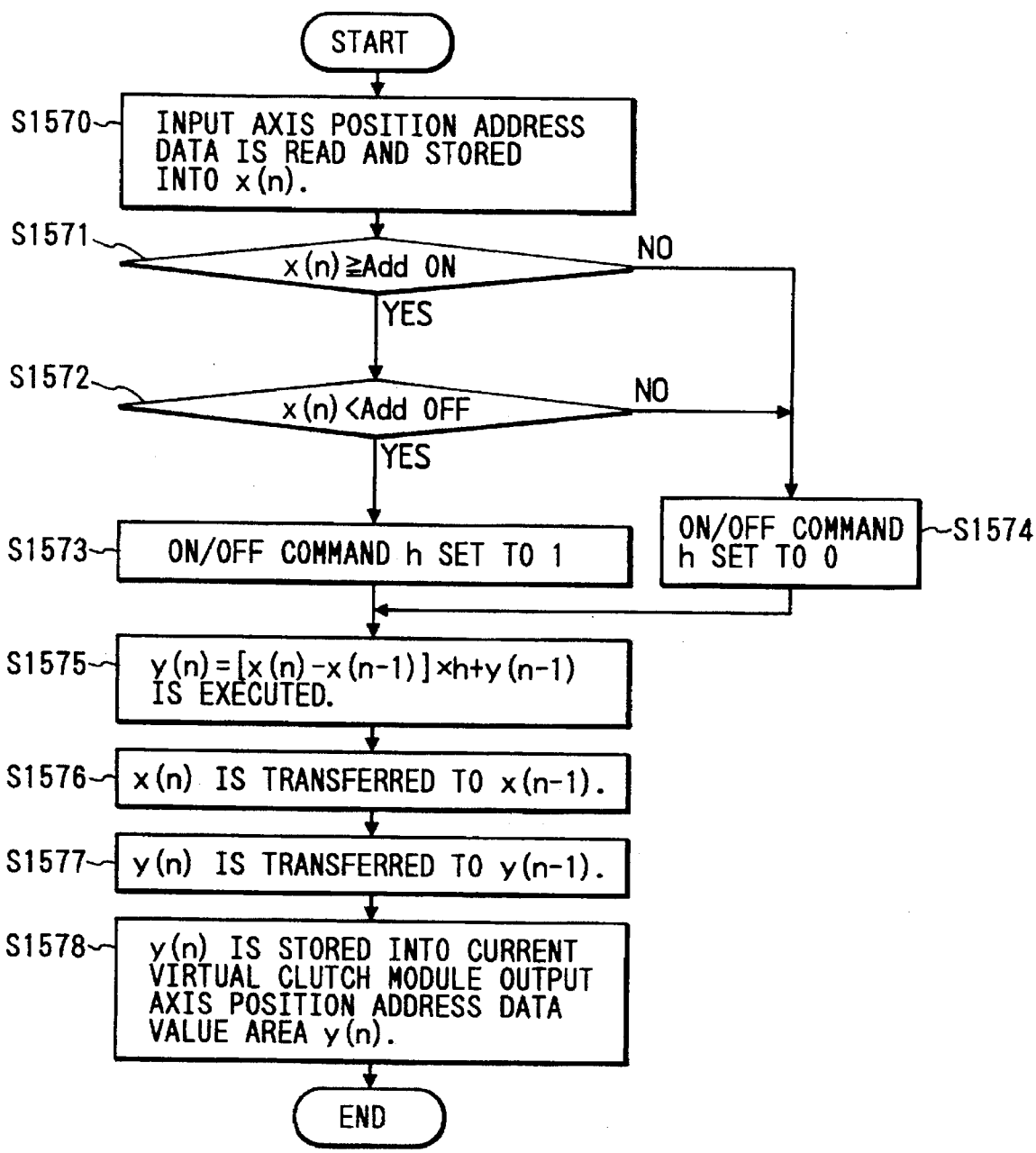

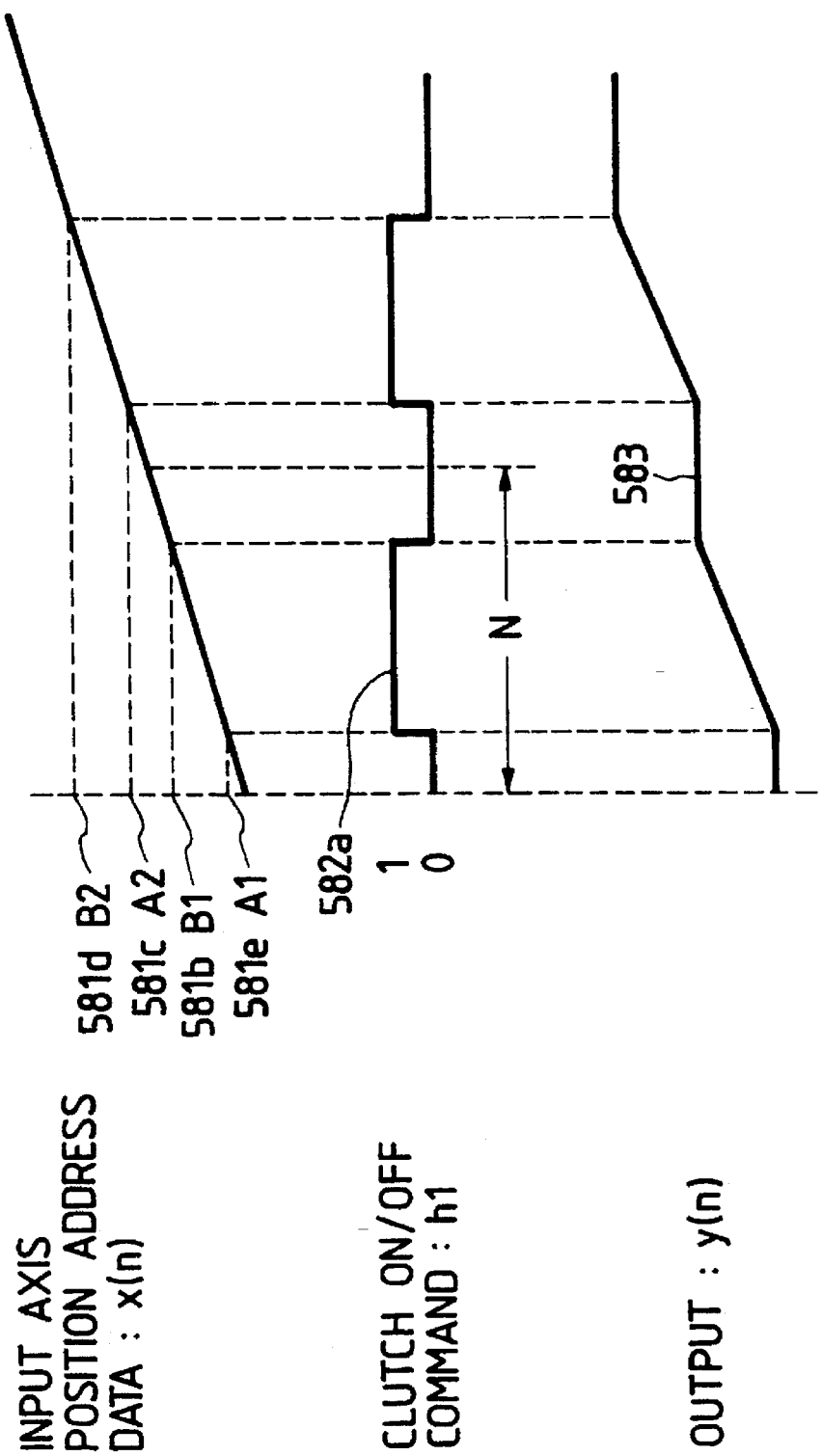

| MODULE NUMBER | | ~610 |
|---|---|---|
| CONNECTION INFORMATION | | ~611 |
| AUXILIARY INPUT AXIS CONNECTION INFORMATION | | ~612 |
| ARITHMETIC EXPRESSION | A=x+z<br>D=D1+(D2−D1)×{(A−A1)/(A2−A1)}<br>y=(h1×D)+h2 | ~622 |
| VARIABLE | STROKE SET VALUE: h1<br>STROKE MINIMUM LIMIT POSITION SET VALUE: h2 | ~623 |

PRIOR ART

FIG. 37

| MODULE NUMBER | | ~610 |
|---|---|---|
| CONNECTION INFORMATION | | ~611 |
| AUXILIARY INPUT AXIS CONNECTION INFORMATION | | ~612 |
| ARITHMETIC EXPRESSION | $A=x+z$<br>$D=D1+(D2-D1)\times\{(A-A1)/(A2-A1)\}$<br>$y=(F\times D)+h2$ | ~630 |
| VARIABLE | STROKE SET VALUE: h1<br>STROKE MINIMUM LIMIT POSITION SET VALUE: h2<br>STROKE VIRTUAL CAM<br>UPDATE ADDRESS ON SHAFT: h4 | ~631 |

PRIOR ART

FIG. 38

| STROKE DATA: F | ~632 |
|---|---|

POSITIONING APPARATUS AND METHOD WITH VIRTUAL TRANSMISSION

BACKGROUND OF THE INVENTION

1. Field of the Invention

This invention relates to a positioning apparatus which controls motors, such as servo motors, and particularly to a positioning apparatus which exercises synchronous control by means of only motors without using any mechanisms, such as coupling shafts, clutches, gears and cams.

2. Description of the Background Art

Conventional art examples will be described with reference to the drawings. FIG. 24 is a general arrangement diagram showing the system configuration of a positioning controller, wherein the numeral 500 indicates a positioning controller, 501a, 501b, 501c and 501d designate servo amplifiers, 502a, 502b, 502c and 502d denote servo motors, 503 represents a position detector, such as an encoder, which detects the position of any machine, 504 indicates a sequence controller which transfers information, such as variables, to and from the positioning controller 500, 505 denotes a peripheral device which performs the programming and monitoring of the positioning controller 500, 506 represents a CPU which executes positioning arithmetic, 507 designates an O/S ROM which stores an O/S for operating the positioning controller 500, 508 indicates a program memory which stores application programs, 509 represents a work memory of the CPU 506, 510 denotes a variable memory which stores parameters and other data required for positioning, 511 designates a communication interface between the sequence controller 504 and the positioning controller 500, 512 indicates a peripheral device interface between the peripheral device 505 and the positioning controller 500, 513 denotes a position detection interface used to enter the output of the position detector 503 into the positioning controller 500, 514 represents a servo amplifier interface between the servo amplifiers 501a, 501b, 501c and 501d and the positioning controller 500, and 515 designates an input/output interface which transfers signals to and from an external device.

FIG. 40 gives a combination example of program modules which output position information to the servo amplifiers 501a to 501d in FIG. 24 using software modules (programs) in Embodiment 1 of Japanese Laid-Open Patent Publication No. HEI05073147, wherein 800 indicates a drive software module (hereinafter referred to as the "virtual drive module") which generates and outputs position information referenced for driving the servo motors, 801 denotes a coupling shaft software module (hereinafter referred to as the "virtual coupling shaft") which synchronizes a plurality of servo motors, or a program used to transmit the output information of the virtual drive module 800, 802, 803, 804 and 805 designate blocks 1 to 4, each representing a block of software modules for a single axis, 806, 808, 811 and 813 indicate transmission software modules (hereinafter referred to as the "virtual transmission modules"), each representing the equivalent for the mechanical transmission means of a gear with software, or programs which transmit the information of the virtual coupling shaft, 809 and 814 denote virtual transmission modules equivalent to clutches, 815 designates a virtual transmission module equivalent to a reduction gear, and 807, 810, 812 and 816 represent output software modules (hereinafter referred to as the "output modules") which output commands to the servo motors.

Operation will now be described with reference to FIG. 24. The positioning controller 500 gives position command values to the servo amplifiers 501a to 501d. The servo amplifiers 501a to 501d control the servo motors 502a to 502d in accordance with said position command values. Also, it is assumed that said four servo motors 502a to 502d are required to operate in synchronization with each other.

Supposing that the output module 807 in FIG. 40 is the software module that gives a command to the servo amplifier 501a, the output module 810 to the servo amplifier 501b, the output module 812 to the servo amplifier 501c, and the output module 816 to the servo amplifier 501d, the servo motors 502a to 502d operate in synchronization with each other in accordance with the position information of the mechanically non-existing virtual coupling shaft which has been generated by the virtual drive module 800.

The conventional virtual transmission modules will now be described with reference to the drawings.

First a first conventional example will be described. FIGS. 25 and 26 show a virtual transmission module equivalent to a power transmission mechanisms clutch (hereinafter referred to as the "virtual clutch module") defined in Embodiment 9 of Japanese Laid-Open Patent Publication No. HEI05073147. FIG. 25 is a memory map of the virtual clutch module stored in the program memory. In FIG. 25, 550 indicates a module number area, 551 designates a connection information area stored with the identification information of the other virtual mechanical module which stores input axis position address data required when the virtual clutch module executes arithmetic processing, and 552 denotes an auxiliary input axis connection information area stored with the information of "No" for the virtual clutch module. 570 represents an area stored with an arithmetic expression executed by the virtual clutch module, and 571 indicates a variable area which is not used by the virtual clutch module. 572 and 573 store parameters or the ON address information and OFF address information of the virtual clutch module. Here, the ON address information and OFF address information indicate addresses relative to input axis position address data.

FIG. 26 shows the map of the work memory which saves data required when the virtual clutch module executes arithmetic, wherein 574 and 575 indicate preceding and current input axis position address data value $x(n-1)$ and $x(n)$ areas, respectively, 576 and 577 designate preceding and current output axis position address data value $y(n-1)$ and $y(n)$ areas, respectively, and 578 denotes a virtual clutch module ON/OFF command information area.

The real-time interrupt processing operation of the virtual clutch module will now be described with reference to FIG. 27. When the virtual clutch module is executed, the input axis position address data is read in accordance with the connection information 551 and stored into the $x(n)$ area 575 at step S1570. Subsequently, at step S1571, the ON address command information 572 of the virtual clutch module is read and compared with said $x(n)$. If $x(n)$ is smaller, the information is judged as a clutch OFF region and the operation jumps to step S1574. If not, the execution advances to step S1572, where the OFF address command information 573 is read and compared with said $x(n)$. If $x(n)$ is smaller, the information is judged as a clutch ON region, ON/OFF command data $h=1$ is stored into the virtual clutch module ON/OFF command area 578 at step S1573, and the processing jumps to step S1575. If the information was judged as the clutch OFF region as a result of said comparison, ON/OFF command data $h=0$ is stored at step S1574 and the execution jumps to step S1575.

Then, at step S1575, the following expression is executed to calculate the current output axis position address data value y(n):

$$y(n)=[x(n)-x(n31\ 1)] \cdot h + y(n-1)$$

Here the value of the virtual clutch module ON/OFF command data h is 1 or 0. Hence, if that value is 1, the result of adding the difference of x(n)–x(n–1) to the preceding output axis address data value y(n–1) is the output of the virtual clutch module. If that value is 0, the preceding output axis address data value y(n–1) is used and kept unchanged as the output of the virtual clutch module.

Subsequently, at steps S1576 and S1577, the current input axis position address data value x(n) is transferred to the preceding input axis position address data value x(n–1) and the current output axis position address data value y(n) is transferred to the preceding output axis position address data value y(n–1) to prepare for the next arithmetic process. Finally, at step S1578, the current output axis position address data value y(n) calculated at step S1575 is provided as the output of the virtual clutch module and stored into the current output axis position address data value area 577, and the operation is terminated. The processing of the flowchart in FIG. 27 is executed in real time to output consecutive position address data.

FIG. 28 shows an operation example of the virtual clutch module. Assuming that A1 is an address at which the clutch is switched on (581a) and B1 is an address at which the clutch is switched off with respect to the input axis position address data X(n), the virtual clutch module ON/OFF command h (582a) is 1 (ON) from a point when the input axis position address data (580) matches A1 to a point just before the same matches B1. Between these points, the output y(n) changes in response to the variation of the input axis position address data. When the virtual clutch module ON/OFF command h (582a) is 0 (OFF), the input y(n) remains unchanged and is kept available if the input axis position address data changes (583).

When it is desired to repeat one cycle of output operation in interval N shown in the figure, for example, and it is assumed that A2 and B2 are a clutch ON address (581c) and a clutch OFF address (581d) commanded in the next cycle, respectively, the arithmetic of A2=A1+N and B2=B1+N must be done by a user sequence program, the input axis position addresses of A2 and B2 commanded again by a programmable controller after the clutch OFF address in one cycle is passed, and this operation repeated thereafter.

Also when it is desired to synchronize a plurality of axes, which are different in clutch ON and OFF addresses, i.e., different in output y(n), to perform one cycle of operation, the arithmetic process must be performed by the user sequence program and commanded again for the number of such axes.

A second conventional art example will now be described with the drawings. FIGS. 29 to 33 show a conventional virtual transmission module equivalent to a cam (hereinafter referred to as the "virtual cam module") which was defined in Japanese Laid-Open Patent Publication No. HEI05073147. FIG. 29 illustrates the virtual cam module, wherein 600 indicates an input axis, 601 designates an auxiliary input axis, 602 denotes an output axis, 620a represents a stroke set value h1, 620b indicates a stroke minimum limit position set value h2, and 604 denotes a black box which contains functions (procedures).

FIG. 30 is a memory map showing how a cam geometry data table is stored into the program memory, wherein 605 indicates position addresses within one revolution of the virtual cam shaft, and 621 represents movement values of a cam corresponding to said position addresses. The movement values of the cam are the values of positions where a stroke bottom dead center is defined as 0 and a stroke top dead center as 1 and change between 0 and 1 within one revolution of the virtual cam shaft. The position addresses within one revolution of the virtual cam shaft are angles equally spaced in one revolution. (e.g., 2000 addresses).

FIGS. 31 and 32 are flowcharts which represent functions (procedures) included in the black box 604.

FIG. 33 is a memory map showing how the virtual cam module is stored into the program memory, wherein 610 indicates a module number and 611 designates connection information which indicates the position address of the input axis. 612 denotes auxiliary input axis connection information which is operative to refer to the position address of the auxiliary input axis. 622 represents arithmetic expressions which are used to find a positioning value output to the output axis 602 and into which the functions (procedures) shown in the flowcharts of FIGS. 31 and 32 are stored. 623 indicates a variable area where the stroke set value 620a and the stroke minimum limit position set value 620b are stored.

Operation will now be described. The virtual cam module shown in FIG. 29 has the position address of the input axis 600 as a main input and the position address of the auxiliary input axis 601 as an auxiliary input. A position address from the other virtual mechanical modules is entered into the input axis 600 as the rotation position information of the virtual cam shaft. Also, the command address of the operation described in a position program is entered into the auxiliary input axis 601 as an offset value to compensate for the rotation position information of the virtual cam shaft entered from the input axis 600.

From these inputs, the stroke set value h1 and stroke minimum limit position set value h2 stored beforehand in the variable area, and the cam geometry data table stored in the program memory as shown in FIG. 30, the virtual cam module calculates a positioning value for reciprocating cam movement and outputs the result of calculation to the output axis 602. The positioning value output for the reciprocating cam movement is transferred to the output module connected next to the output axis to drive the servo motor.

The way of calculating the positioning value output for reciprocating cam movement, which is included in the black box as functions (procedures), will now be described with reference to the flowcharts in FIGS. 31 and 32. In FIG. 31, the position address x of the input axis and the position address z of the auxiliary input axis are first imported (S1620), and the sum thereof is then converted into the position address within one revolution (S1621). The position address within one revolution is represented by a remainder which is obtained by dividing the sum of the position address of the input axis and the position address of the auxiliary input axis by a one-revolution value (360°). The value thus found is the rotation position information of the virtual cam shaft. Subsequently, the movement value of the cam corresponding to the rotation position information is found with reference to the cam geometry data table (S1622). This procedure is detailed in FIG. 32.

In FIG. 32, the position address within one revolution of the virtual cam shaft A1 and A2, which satisfy the relationship of A1≦A<A2 as to the rotation position information A of the virtual cam shaft, are first retrieved from the cam geometry data table in FIG. 30 (S1630). Then, the operation values of the cam movement corresponding to the position addresses within one revolution A1 and A2 are obtained from the cam geometry data table in FIG. 30 and are defined as D1 and D2 (S1631). The movement value D of the cam corresponding to the rotation position information A of the virtual cam shaft is calculated from the position addresses within one revolution A1 and A2 and the movement valued D1 and D2 of the cam by the following expression (S1632):

$$D=D1+(D2-D1)\times\{(A-A1)/(A2-A1)\}$$

This expression makes a proportional distribution calculation on the basis of the position addresses within one revolution since the movement values of the cam stored in the cam geometry data table have discrete values with respect to the position addresses within one revolution of the virtual cam shaft.

From the movement value of the cam D corresponding to the rotation position information of the virtual cam shaft found in the procedure shown in FIG. 32 and the stroke set value hi and stroke minimum limit position set value h2 stored beforehand in the variable area, the positioning value for continuous reciprocating cam movement is calculated by the following expression (S1623 in FIG. 31):

$$(h1\times D)+h2$$

This is a reciprocating motion between the minimum limit position h2 and maximum limit position (h1+h2) of the cam movement. The positioning value found is output to the output axis (S1624) and transferred to the output module connected next to the output axis to drive the servo motor.

A third conventional example will now be described. FIGS. 34 to 38 show a conventional virtual transmission module equivalent to a cam (hereinafter referred to as the "virtual cam module") which was defined in Japanese Laid-Open Patent Publication No. HEI05073147. FIG. 34 illustrates the virtual cam module, wherein 600 indicates an input axis, 601 designates an auxiliary input. axis, 602 denotes an output axis, 620a represents a stroke set value h1, 620b indicates a stroke minimum limit position set value h2, 620c designates an update address h4 of the virtual cam shaft where the stroke of the cam is updated, and 604 denotes a black box which contains a function (procedure).

FIG. 35 is a memory map showing how a cam geometry data table is stored into the program memory, wherein 605 indicates position addresses within one revolution of the virtual cam shaft, and 621 represents movement values of a cam corresponding to said position addresses.

Since the change of the stroke during the cam movement operation requires the set value to be imported at the stroke bottom dead center, the position address within one revolution of the virtual cam shaft corresponding to the stroke bottom dead center is defined as the update address 620c of the virtual cam shaft at which the stroke of the cam movement is updated (180° in the example of FIG. 35).

FIG. 36 is a flowchart which represents the function (procedure) included in the black box 604.

FIG. 37 is a memory map showing how the virtual cam module is stored into the program memory, wherein 610 indicates a module number and 611 designates connection information which is operative to refer to the position address of the input axis. 612 denotes auxiliary input axis connection information which is operative to refer to the position address of the auxiliary input axis. 630 represents arithmetic expressions which are used to find a positioning value output to the output axis 602 and into which the function (procedure) shown in the flowchart of FIG. 36 is stored. 632 indicates a variable area where the stroke set value 620a, the stroke minimum limit position set value 620b and the update address 620c of the virtual cam shaft where the stroke of the cam movement is updated are stored.

FIG. 38 is a memory map of the work memory used to find the positioning value output to the output axis 602. 632 indicates stroke data.

Operation will now be described. The virtual cam module shown in FIG. 34 has the position address of the input axis 600 as a main input and the position address of the auxiliary input axis 601 as an auxiliary input. A position address from the other virtual mechanical module is entered into the input axis 600 as the rotation position information of the virtual cam shaft. Also, the command address of the operation described in a conventional form of positioning program is entered into the auxiliary input axis 601 as an offset value to compensate for the rotation position information of the virtual cam shaft entered from the input axis 600.

From these inputs, the stroke set value 620a, the stroke minimum limit position set value 620b and the update address 620c of the virtual cam shaft where the stroke of the cam movement is updated, which are stored beforehand in the variable area, and the cam geometry data table stored in the program memory 9 as shown in FIG. 34, the virtual cam module calculates a positioning value for reciprocating cam movement and outputs the result of calculation to the output axis 602. The positioning value output for the reciprocating cam movement is transferred to the output module connected next to the output axis to drive the servo motor.

The way of calculating the positioning value output for reciprocating cam movement, which is included in the black box as the function (procedure), will now be described with reference to the flowchart in FIG. 36.

In FIG. 36, the position address x of the input axis and the position address z of the auxiliary input axis are first imported (S1640), and the sum thereof is then converted into the position address within one revolution (S1641). The position address within one revolution is represented by a remainder which is obtained by dividing the sum of the position address of the input axis and the position address of the auxiliary input axis by a one-revolution value (360°). The value thus found is the rotation position information of the virtual cam shaft.

Then, it is judged whether or not the rotation position information of the virtual cam shaft has exceeded the update address 620c of the virtual cam shaft at which the stroke of the cam movement is updated (S162). If the information has exceeded the address, the stroke set value 620a in the variable area set from the external device is updated to be the stroke data 602 in the work memory 10. If the information has not exceeded the address, the stroke data 632 is not updated.

Subsequently, the movement value of the cam corresponding to the rotation position information of the virtual cam shaft is found with reference to the cam geometry data table (S1644). This procedure has already been described in FIG. 32.

From the determined movement value of the cam D corresponding to the rotation position information of the virtual cam shaft, the stroke data F in the work memory 10, and the stroke minimum limit position set value h2 stored beforehand in the variable area, the positioning value for continuous reciprocating cam movement is calculated by the following expression (S1645 in FIG. 36):

$$(F\times D)+h2$$

This is a reciprocating motion between the minimum limit position (F+h2) of the cam movement and this stroke F is updated per stroke even during the cam movement operation. The positioning value found is output axis (S1646) and transferred to the output module connected next to the output axis to drive the servo motor.

A fourth conventional example will now be described with reference to the drawings. FIG. 39 shows the operation of this conventional example. In this drawing, 762 indicates a cam pattern, 763a, 763b and 763c represent limit output patterns, 764a denotes point 1, 764b designates point 2, 764c indicates point 3, 764d denotes point 4, and similarly, 764e represents point n−1 and 764f designates point n, 765a indicates interval 0 from a stroke minimum limit value at the actual current value of a cam to point 1, 765b designated interval 1 from point 1 at the actual current value of the cam to point 2, 765c denotes interval 2 from point 2 at the actual current value of the cam to point 3, 765d indicates interval 3 from point 3 at the actual current value of the cam to point 4, and similarly, 765e represents interval n−1 from point n−1 at the actual current value of the cam to point n and 765f indicates interval n from point n at the actual current value of the cam to a stroke maximum limit value, and 766a, 766b, 766c, 766d, 766e, 766f, 766g, 766h, 766i, 766j, 766k and 766l designate limit output ON/OFF points on the cam pattern, indicating limit output states in which ON and off signals are output to the outside in response to the actual current values of the cam.

Namely, the limit output is ON in the ranges point 766a to point 766b and point 766k to point 766l of the limit output pattern 1, in the ranges point 766c to point 766d and point 766i to point 766j of the limit output pattern 2, and in the ranges point 766e to point 766f and point 766g to point 766h of the limit output pattern 3.

The above operation may be applied to a filling machine. For example, it may be assumed that the pushing-up (vertical) operation of bottles, packages, etc. is controlled according to a cam pattern on a filling machine, that a filling nozzle is initially lowered at the position of the bottle, package or the like, and that the nozzle is raised according to a filling amount. If a limit switch output signal is provided at the position of a vertical axis to lower the filling nozzle, the output signal is given when the vertical axis rises (e.g., at point 766a of the limit output pattern 1 in FIG. 39) and also when the vertical axis lowers (e.g. at point 766k of the limit output pattern 1 in FIG. 39) because the limit switch output is provided at the actual current value of the vertical axis (stroke by the cam). In this example of the filling machine, the limit switch output signal must not be provided when the vertical axis lowers and measures must be taken to give a limit switch output disable command, for example, during the lowering period of the vertical axis under the control of a user sequence program. Also, when the shape of an object filled changes, the cam pattern must be changed. Since the operation range (stroke range) of the vertical axis changes accordingly, the setting of the limit switch output pattern must also be changed.

SUMMARY OF THE INVENTION

The virtual clutch module of the conventional first positioning apparatus, which is arranged as described above, had a problem such that when a single cycle of positioning operation is controlled continuously and repeatedly to command the ON/OFF addresses of the clutch with respect to the input axis position address data, the ON/OFF command addresses of the clutch in the next cycle must be calculated and commanded again in real time under the control of a user sequence program.

The virtual clutch module of the conventional first positioning apparatus, which was arranged as described above, also had a problem such that when a single cycle of synchronizing a plurality of axes is controlled continuously and repeatedly, the ON/OFF command addresses of the clutch in the next cycle must be calculated and commanded again in real time under the control of a user sequence program for the number of axes synchronized.

It is a first object of the present invention to solve such problems by providing a positioning apparatus which allows a single cycle of positioning operation to be performed continuously and repeatedly without requiring a user to operate on and re-command the ON/OFF command addresses of the clutch in real time.

The virtual cam module of the second conventional positioning apparatus, which was designed as described in Japanese Laid-Open Patent Publication No. HEI05073147, can operate the virtual cam module in synchronization with the position information output by the virtual drive module but had a problem such that a first virtual cam module and a second virtual cam module cannot perform circular motions as a single joint-motion operation. Accordingly, since a circular motion required for machining, such as spot facing, in metal working was conducted by circular interpolation described in a conventional form of positioning program, an arc radius had to be changed by stopping the motor once, subsequently changing the radius designation in the positioning program, and restarting the positioning program.

It is a second object of the present invention to overcome such disadvantages by providing a positioning apparatus which allows the first virtual cam module and second virtual cam module to perform circular motions as a single joint-motion operation and permits a stroke (radius designation) to be changed at a stroke bottom dead center, whereby the radius of a circular motion can be changed without stopping a motor.

The virtual cam module of the conventional third positioning apparatus, which was arranged as described in Japanese Laid-Open Patent Publication No. HEI05073147, allows the stroke to be changed only at the stroke bottom dead center during cam movement operation when the amount of spot facing in metal working is increased gradually, for example, whereby since a linear motion is made according to the increment/decrement of the stroke and a circular motion is then performed at the time of stroke change, the first virtual cam module and second virtual cam module cannot perform smoothly continuous spiral motions as a single joint-motion operation.

It is a third object of the present invention to solve such problems by providing a positioning apparatus which allows the first virtual cam module and second virtual cam module to perform spiral motions as a single joint-motion operation.

The virtual cam module of a conventional second positioning apparatus, which was arranged as described in Japanese Laid-Open Patent Publication No. HEI05073147, made it difficult to change the geometry of a cam while the apparatus is being operated.

It is a fourth object of the present invention to solve such problem by providing a positioning apparatus which allows a cam movement pattern to be changed easily while the apparatus is being operated.

The virtual cam module of the conventional second positioning apparatus, which was arranged as described in Japanese Laid-Open Patent Publication No. HEI05073147, had a problem such that when the starting position of a cam shifts relative to a metal plate due to the length-direction deformation of the metal plate in the working and cutting of the metal plate per given length according to a cam pattern in metal working or the like, for example, the cam movement must be started anew from the starting position of the cam relative to the metal plate, i.e. the operation must be performed to the mid-point of a single cycle of cam pattern and subsequently must be restarted from the beginning of the single cycle of the cam pattern. However, it is difficult to do so.

It is a fifth object of the present invention to solve this problem by providing a positioning apparatus which easily allows the operation to be performed up to the midway of the single cycle of cam pattern and subsequently to be started from the beginning of the single cycle of cam pattern.

The virtual cam module of the conventional fourth positioning apparatus, which was designed as described above, had a problem in that time and labor were required when it was desired to change the limit switch output in a single cycle of cam reciprocation.

It is a sixth object of the present invention to solve that problem by providing a positioning apparatus which allows the limit switch output to be changed as appropriate in a single cycle of cam reciprocation.

The virtual cam module of the conventional fourth positioning apparatus, which was designed as described above, had a problem in that the limit switch output must be changed when the cam pattern and stroke are changed, requiring time and labor.

It is a seventh object of the present invention to provide a positioning apparatus which does not require the limit switch output pattern to be changed if the cam pattern and stroke are changed.

BRIEF DESCRIPTION OF THE DRAWINGS

FIG. 2 is a program memory map for a virtual transmission module in the positioning apparatus according to an embodiment of the invention.

FIG. 3 is a work memory map for a virtual clutch module in the positioning apparatus according to an embodiment of the invention.

FIG. 22 is a memory map showing how limit switch output information is stored in the positioning apparatus according to an embodiment of the invention.

FIG. 25 is a program memory map for a virtual transmission module in a positioning apparatus according to a first conventional art example.

FIG. 26 is a work memory map for a virtual clutch module in the positioning apparatus according to the first conventional art example.

FIG. 27 is a flowchart illustrating the operation of the virtual clutch module in the positioning apparatus according to the first conventional art example.

FIG. 28 is a diagram illustrating the operation example of the virtual clutch module in the positioning apparatus according to the first conventional art example.

FIG. 37 is a memory map illustrating how the virtual cam module in the third conventional art example is stored in a memory.

FIG. 38 is a memory map of a work memory used by the virtual cam module in the third conventional art example to find a positioning value to be output.

PREFERRED EMBODIMENTS OF THE INVENTION

Figure 1:
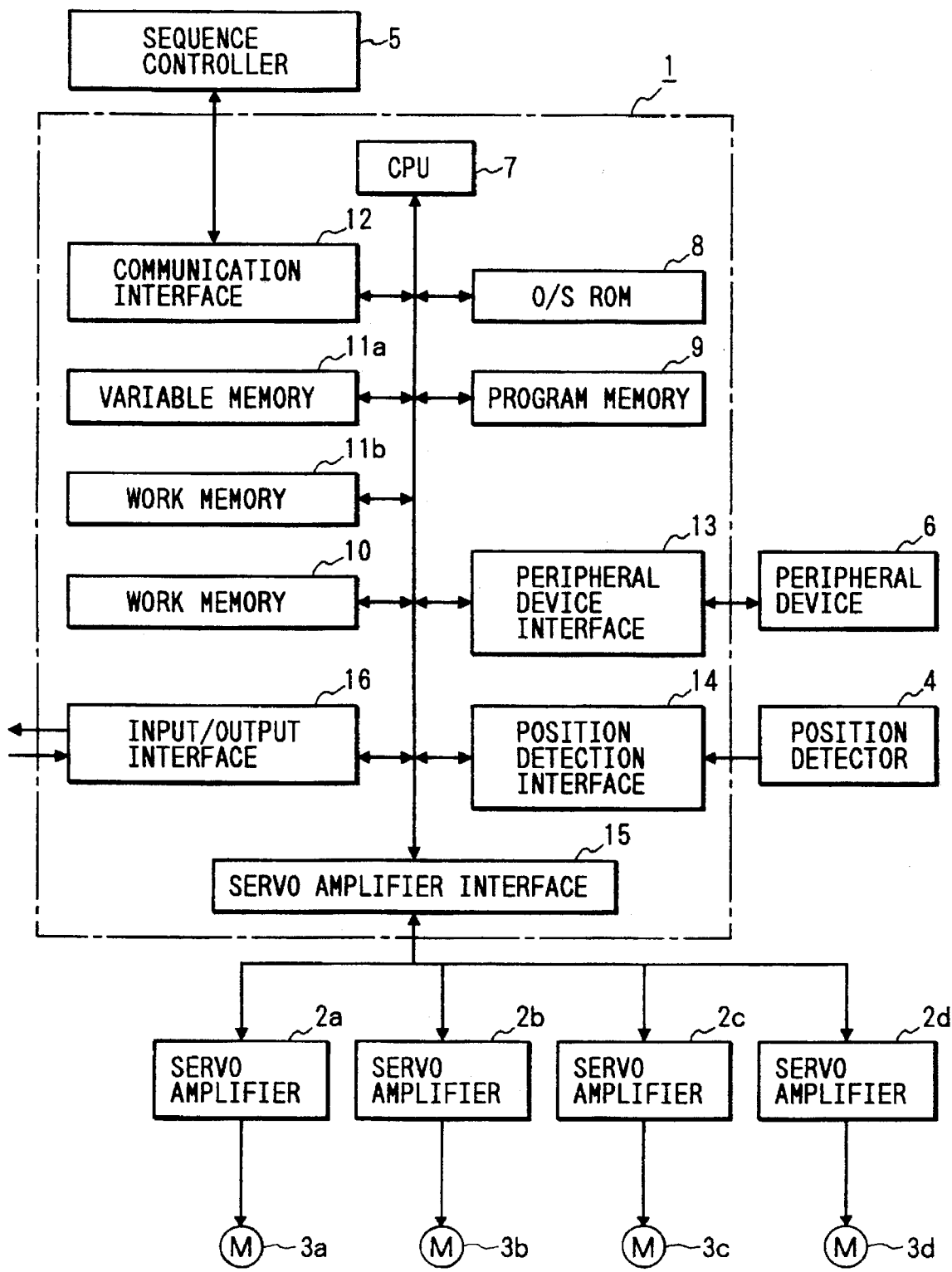
FIG. 1 is a system configuration diagram of a positioning apparatus according to an embodiment of the present invention.

FIG. 1 is a general arrangement diagram showing the system configuration of a positioning controller, wherein the numeral 1 indicates a positioning controller, 2a, 2b, 2c and 2d designate servo amplifiers, 3a, 3b, 3c and 3d denote servo motors, 4 represents a position detector, such as an encoder, which detects the position of any machine, 5 indicates a sequence controller which transfers information, such as variables, to and from the positioning controller 1, 6 denotes a peripheral device which performs the programming and monitoring of the positioning controller 1, 7 represents a CPU which executes positioning arithmetic, 8 designates an O/S ROM which stores an O/S for operating the positioning controller 1, 9 indicates a program memory which stores application programs, 10 represents a work memory of the CPU 7, 11a denotes a variable memory which stores parameters, etc. required for positioning, 11b designates a data memory which stores data such as cam data, 12 indicates a communication interface between the sequence controller 5 and the positioning controller 1, 13 designates a peripheral device interface between the peripheral device 6 and the positioning controller 1, 14 denotes a position detection interface used to enter the output of the position detector 4 into the positioning controller 1, 15 represents a servo amplifier interface between the servo amplifiers 2a, 2b, 2c and 2d and the positioning controller 1, and 16 indicates an input/output interface which transfers signals to and from an external device.

Embodiment 1

An embodiment of a virtual transmission module will be described with reference to FIGS. 2 to 6, which illustrate a virtual transmission module equivalent to a clutch (hereinafter referred to as the "virtual clutch module"). Although in practice the virtual clutch module does not operate independently and is used in combination with the other virtual mechanical modules, the operation of the virtual clutch module as used independently will be described here for simplicity, its use in combination with other modules being clear to one of ordinary skill in the art.

FIG. 2 is a memory map of the virtual clutch module stored in the program memory 9. In FIG. 2, 550 indicates a module number area, 551 designates a connection information area stored with the identification information of the other virtual mechanical module which stores input axis position address data required when the virtual clutch module executes arithmetic, and 552 denotes an auxiliary input axis connection information area stored with the information of "No" for the virtual clutch module. 553 represents an area stored with an arithmetic expression executed by the virtual clutch module, 554a indicates a variable memory address area storing the ON/OFF command information of the virtual clutch module, 554b and 554c denote variable memory address areas storing the ON address command information and OFF address command information of the virtual clutch module, respectively, and 555 designates a parameter area stored with the number of input axis one-revolution pulses N.

FIG. 3 shows the map of the work memory 10 which saves data required when the virtual clutch module executes its arithmetic process, wherein 556 and 557 indicate preceding and current input axis position address data value $x(n-1)$ and $x(n)$ areas, respectively, 558 and 559 indicate preceding and current input axis position address data value $y(n)$ and $y(n-1)$ areas, 560 designates preceding and current output axis within-one-revolution address data value $xa(n)$ area, 561 represents a preceding virtual clutch module status value h0 area, 562 indicates a virtual clutch module ON/OFF command information h1 area, 563 and 564 designate virtual clutch module ON address command information h2 and OFF address command information h3 areas, respectively.

Figure 4:
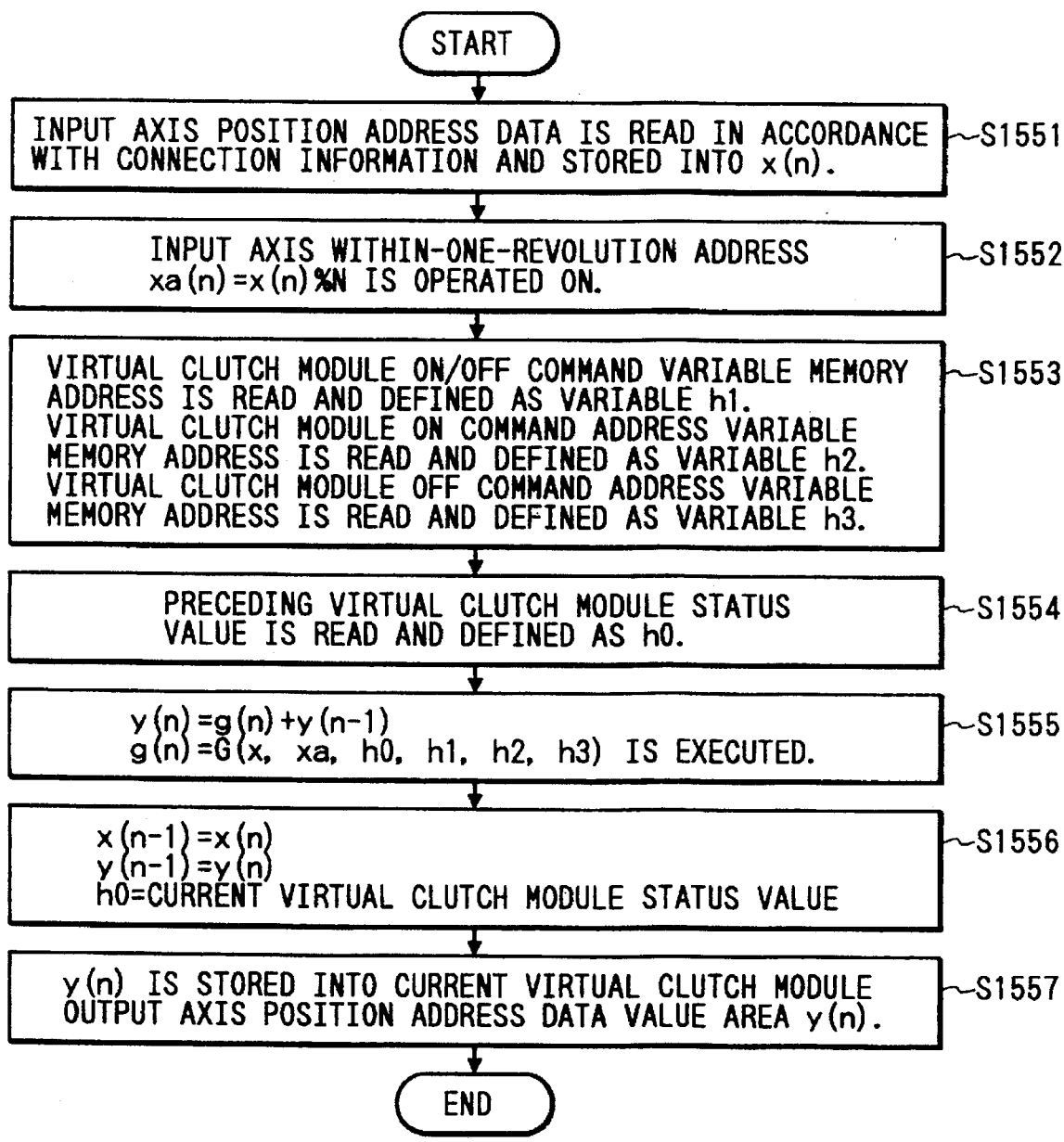
FIG. 4 is a flowchart illustrating the operation of the virtual clutch module in the positioning apparatus according to an embodiment of the invention.
Figure 5:
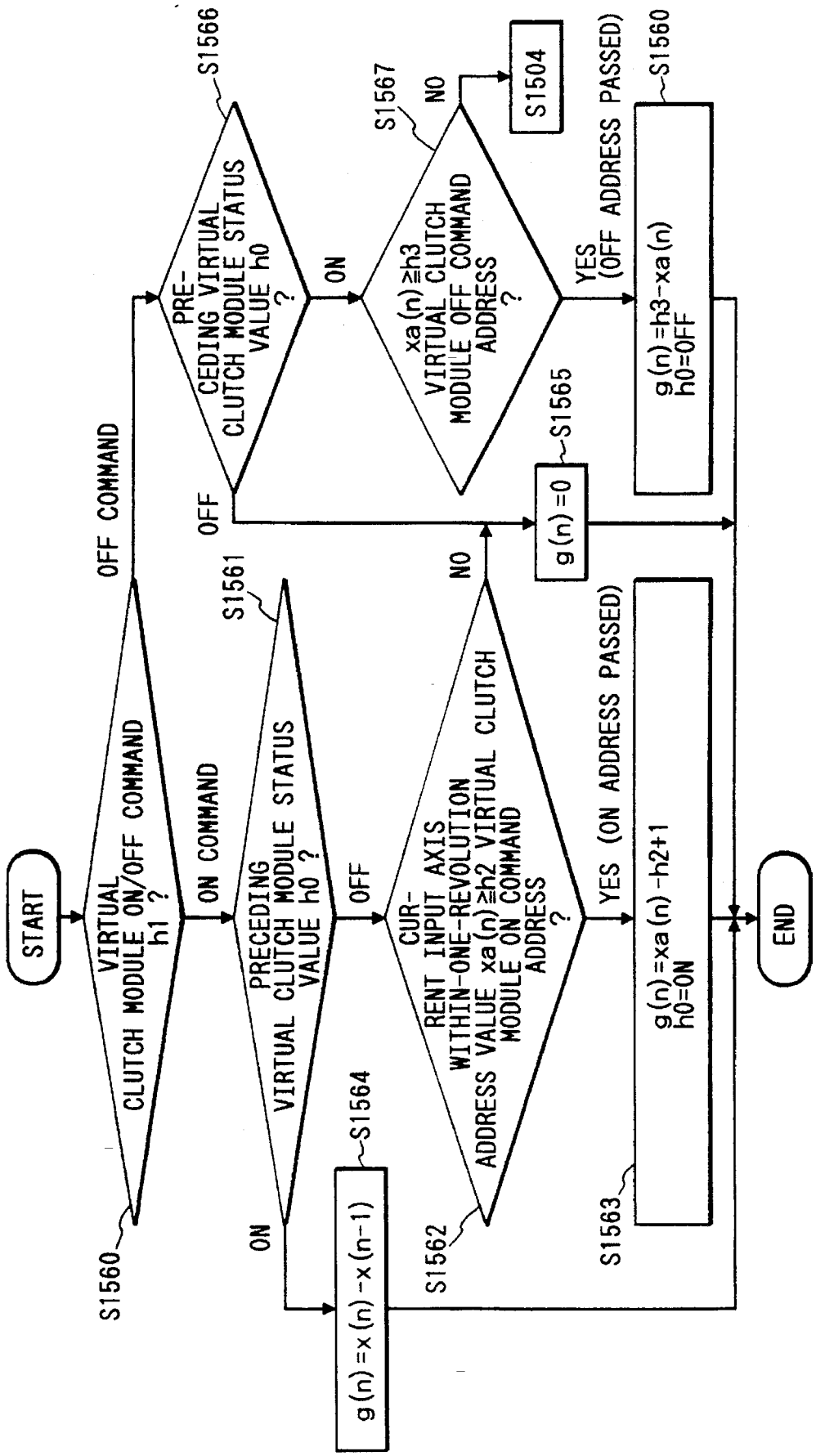
FIG. 5 is a flowchart illustrating the operation of the virtual clutch module in the positioning apparatus according to an embodiment of the invention.

FIGS. 4 and 5 are flowcharts indicating the operation of the virtual clutch module or part of the operation of real-time interrupt processing.

Operation will now be described in accordance with FIG. 4. When the virtual clutch module is executed, the input axis position address data is read in accordance with the connection information 551 and stored into the $x(n)$ area 557 at step S1551. Subsequently, at step S1552, the number of input axis one-revolution pulses 555 is read and the address within one revolution of input axis $xa(n)$ is found according to Expression 100:

Address within one revolution of input axis: $xa(n) = x(n) \% N$ ... Expression 100 where N=number of input axis one-revolution pulses % =remainder operator

Then, at step S1553, the variable memory address area 554a stored with the ON/OFF command information of the virtual clutch module and the variable memory address areas 554b, 554c stored with the ON address command information and OFF address command information of the virtual clutch module are read and the corresponding variable memory addresses are read and defined as variables h1, h2 and h3. Then, at step S1554, the preceding virtual clutch module status value 561 is read and defined as variable h0.

Subsequently, the current output axis position address data value $y(n)$ is found in accordance with Expression 101 at step S1555, and the current input axis position address data value $x(n)$ is transferred to the preceding input axis position address data value $x(n-1)$, the current output axis position address data value $y(n)$ is transferred to the preceding output axis position address data value $y(n-1)$, and the current virtual clutch module status value is transferred to the preceding value h0 to prepare for the next arithmetic process at step S1556. Finally, at step S1557, the current output axis position address data value $y(n)$ calculated at step S1555 is stored into the current output axis position address data value area 559 as the output of the virtual clutch module, and the operation is terminated. The processing of the flowchart in FIG. 4 is executed in real time to output consecutive position address data.

$y(n)=g(n)+y(n-1)$    Expression 101

$g(n)=G(x, xa, h0, h1, h2, h3)$    Expression 102 where x=input axis position address data
  xa=address within one revolution of input axis
  h0=preceding virtual clutch module status value
  h1=virtual clutch module ON/OFF command information
  h2=virtual clutch module ON command address
  h3=virtual clutch module OFF command address Here, Expression 102 indicates a function used to calculate a travel per unit time transmitted as the output by the processing of this virtual clutch module, and the operation thereof is given in the flowchart of FIG. 5.

The virtual clutch module ON/OFF command information h1 is judged at step S1560. If it is the OFF command, the execution jumps to step S1566. If it is the ON command, it is judged at step S1561 whether the preceding virtual clutch module status value h0 is ON or OFF. If it is ON, the operation jumps to step S1564. If it is OFF, it is judged at step S1562 whether current input axis within-one-revolution address value xa(n) has passed the virtual clutch module ON command address h2. If it has passed, the current travel per unit time g(n)≠is set equal to xa(n)−h2+1 and the current virtual clutch module status value is set to ON at step S1563. If the value xa(n) has not passed, the processing jumps to step S1565, where g(n)≠is set equal to 0, i.e., the virtual clutch module is switched OFF (disconnected). At step S1564, the virtual clutch module is ON (connected) and g(n)≠is set equal to x(n) −x(n−1).

Subsequently, when the virtual clutch module is given the OFF command, it is judged at step S1566 whether the preceding virtual clutch module status value h0 is ON or OFF. If it is OFF, the execution jumps to step S1565. If it is ON, it is judged at step S1567 whether the current input axis within-one-revolution address value xa(n) has passed the virtual clutch module OFF command address h3. If it has passed, the current travel per unit time g(n) is set to ≠h3−xa(n) and the current virtual clutch module status value is set to OFF at step S1568. If the value xa(n) has not passed, the processing jumps to step S1504, and this flowchart is terminated.

Figure 6:
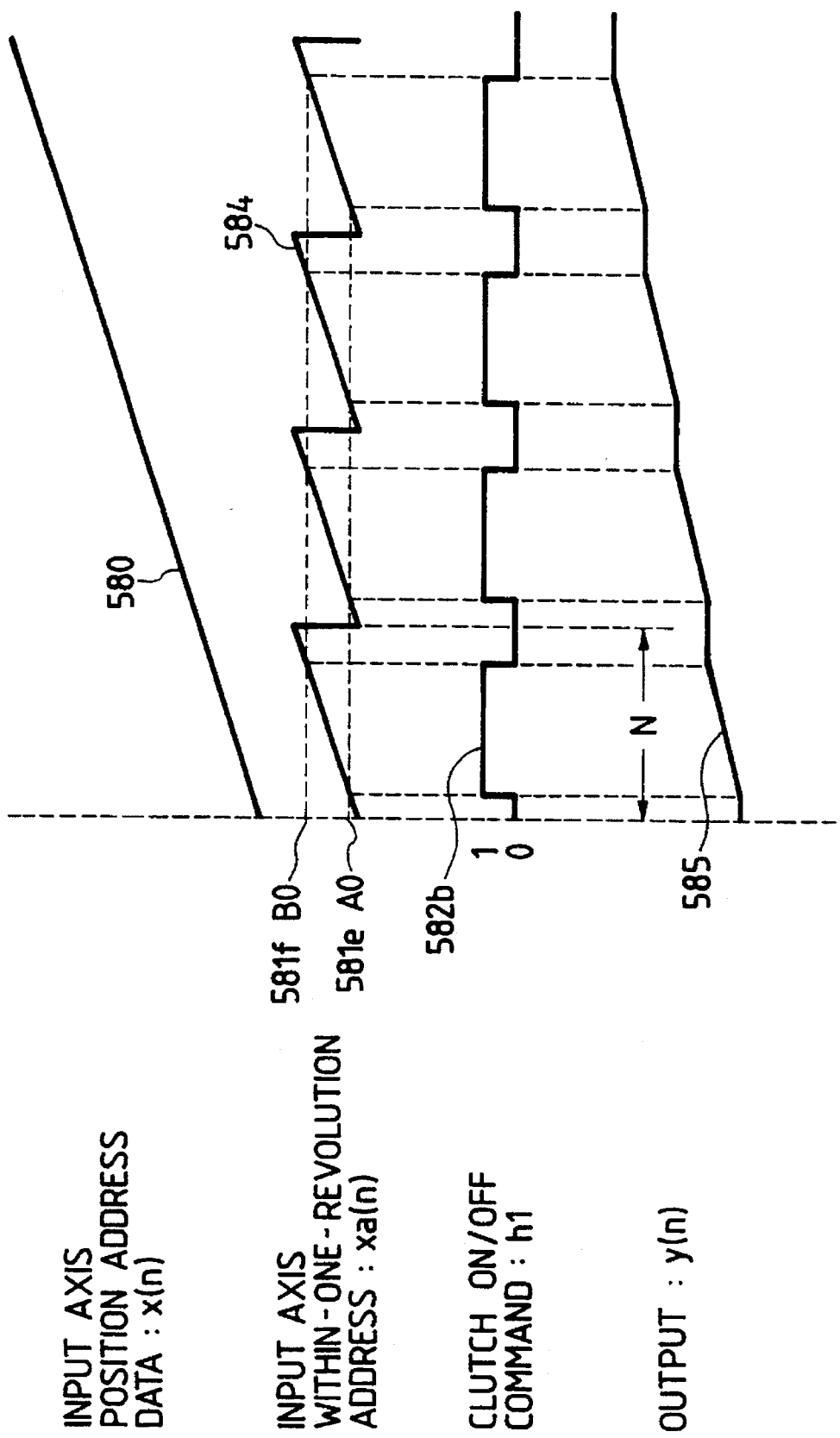
FIG. 6 is a diagram illustrating the operation example of the virtual clutch module in the positioning apparatus according to an embodiment of the invention.

FIG. 6 shows the operation example of this virtual clutch module. Supposing that N is a single-cycle interval of output operation relative to input axis position address data X(n) (580), the address within one revolution of input axis xa(n) repeats the pattern of 0 to N−1 (584). If it is assumed that A0 (581e) is an address at which the clutch is switched ON and B0 (581f) is an address at which the clutch is switched OFF (0≦A0, B0<N), the virtual clutch module ON/OFF command h1 (582b) is 1 (ON) from a point when the address within one revolution of input axis (584) matches A0 to a point just before the same matches B0, and the output y(n) in that interval changes in response to the variation of the address within one revolution of input axis (584), i.e., the input axis position address data. When the virtual clutch module ON/OFF command h1 (582b) is 0 (OFF), the output y(n) remains unchanged if the input axis position address data changes.

When it is desired to repeat the output operation in interval N shown in the figure, control is repeated automatically according to the changes of the input axis position address data without requiring the clutch ON and OFF addresses to be operated on and re-commanded under the control of a user sequence program.

Embodiment 2

Figure 7:
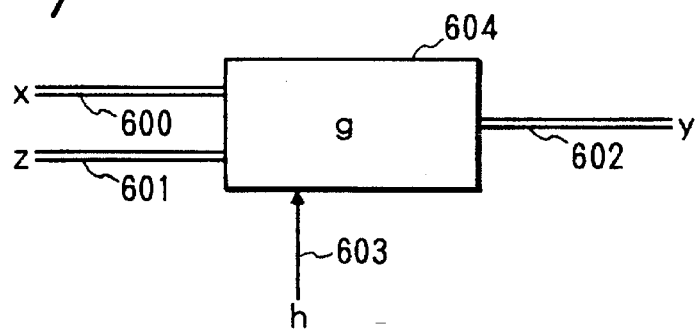
FIG. 7 is a block diagram illustrating a virtual cam module for continuous reciprocating operation concerned with an embodiment of the invention.

Another embodiment of the virtual transmission module will now be described with reference to FIGS. 7 to 12. FIG. 7 shows a virtual transmission module equivalent to a cam (hereinafter referred to as the "virtual cam module"), wherein 600 indicates an input axis, 601 designates an auxiliary input axis, 602 denotes an output axis, 603 represents a stroke set value h, and 604 indicates a black box which contains functions (procedures).

Figure 8:
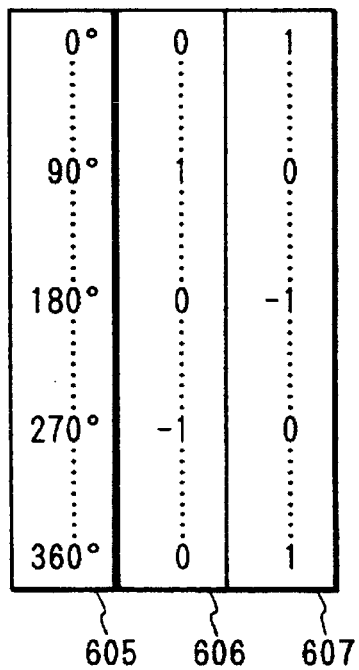
FIG. 8 is a memory map illustrating how a cam geometry data table of the virtual cam module concerned with an embodiment of the invention is stored in a memory.

FIG. 8 is a memory map showing how a cam geometry data table is stored into the program memory 9, wherein 605 indicates position addresses within one revolution of the virtual cam shaft, and 606 and 607 represent cam movement values corresponding to those position addresses. The cam movement values indicate values corresponding to cam positions where a stroke bottom dead center is defined as −1 and a stroke top dead center as +1 and the values change between −1 and 1 within one revolution of the virtual cam shaft. The position addresses within one revolution of the virtual cam shaft are angles equally spaced in one revolution (e.g. 2000 addresses).

Figure 9:
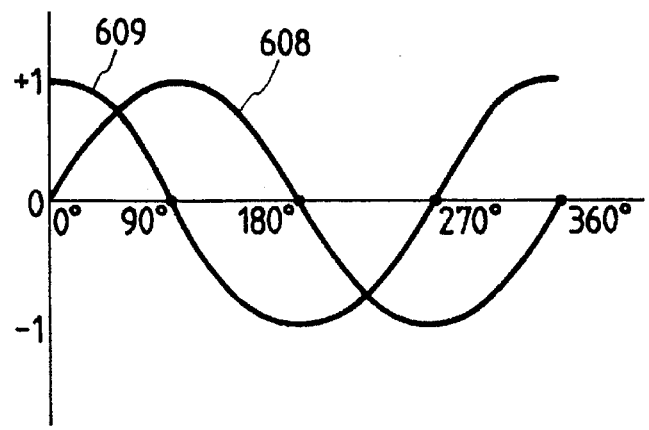
FIG. 9 is a diagram illustrating a graphed cam geometry data table of the virtual cam module concerned with an embodiment of the invention.

FIG. 9 is a graph which illustrates the cam movement values corresponding to the position addresses identified by 606 and 607 in the cam geometry data table of FIG. 8, wherein 608 indicates that the cam movement values identified by 606 are set as a sine curve and 609 indicates that the cam movement values identified by 607 are set as a cosine curve.

Figure 10:
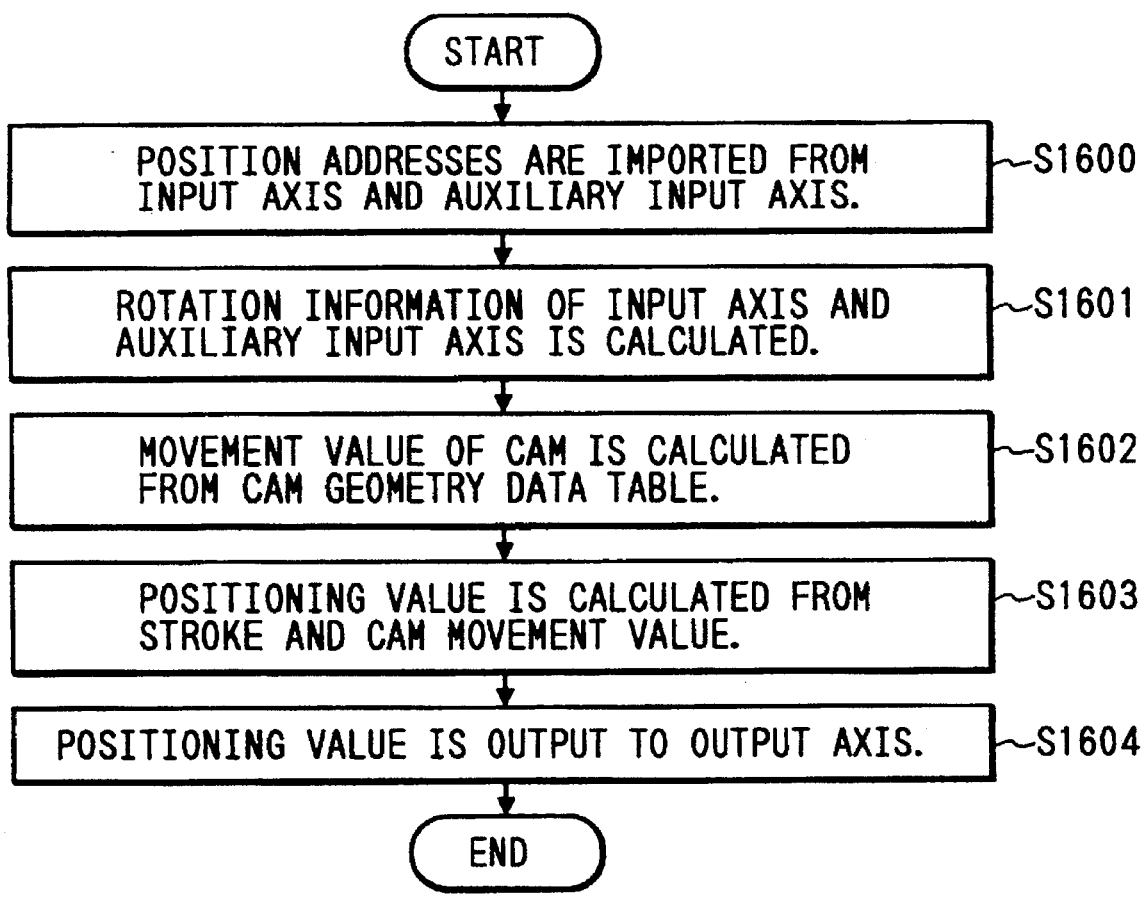
FIG. 10 is a flowchart illustrating a function included in the virtual cam module concerned with an embodiment of the invention.
Figures 11, 12:
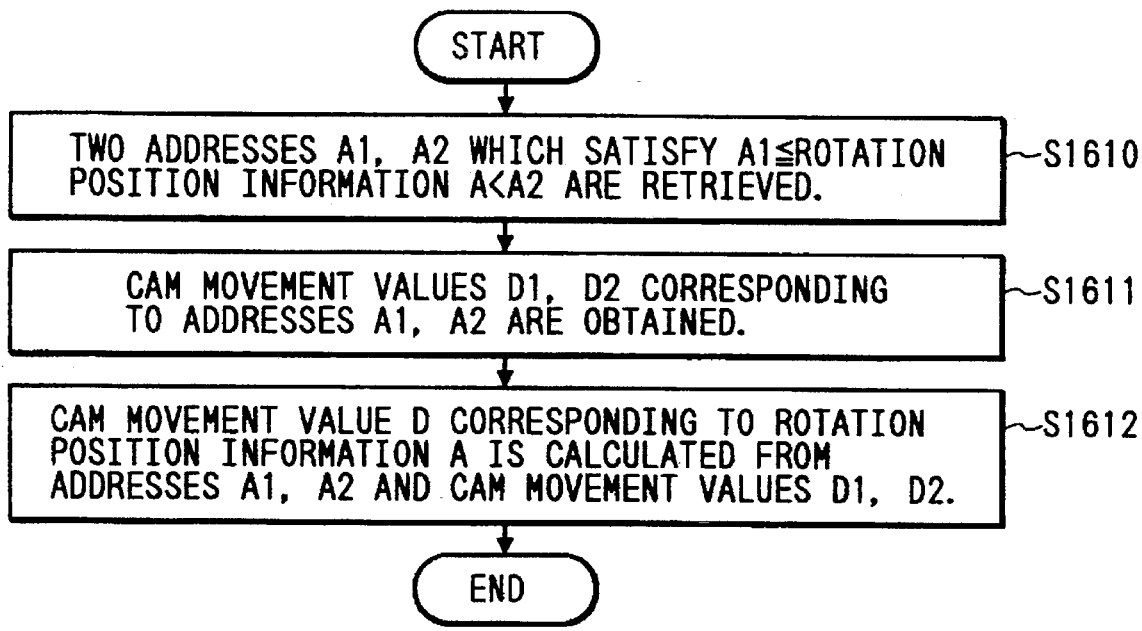
FIG. 11 is a flowchart illustrating a function included in the virtual cam module concerned with an embodiment of the invention.
FIG. 12 is a memory map illustrating how the virtual cam module concerned with an embodiment of the invention is stored in a program memory.

FIGS. 10 and 11 are flowcharts which represent functions (procedures) included in the black box 604.

FIG. 12 is a memory map showing how the virtual cam module is stored into the program memory 9, wherein 610 indicates a module number and 611 designates connection information which refers to the position address of the input axis. 612 denotes auxiliary input axis connection information which refers to the position address of the auxiliary input axis. 613 represents arithmetic expressions which are used to find a positioning value output to the output axis 602 and into which the functions (procedures) shown in the flowcharts of FIGS. 10 and 11 are stored. 614 indicates a variable area where the stroke set value (arc radius) 603 is stored.

Operation will now be described. The virtual cam module shown in FIG. 7 has the position address of the input axis 600 as a main input and the position address of the auxiliary input axis 601 as an auxiliary input. A position address from the other virtual mechanical module is entered into the input axis 600 as the rotation position information of the virtual cam shaft. Also, the command address of the operation described in a conventional form of positioning program is entered into the auxiliary input axis 601 as an offset value to compensate for the rotation position information of the virtual cam shaft entered from the input axis 600.

From these inputs, the stroke set value 603 stored beforehand in the variable area and the cam geometry data table stored in the program memory 9 as shown in FIG. 8, the virtual cam module calculates a positioning value for reciprocating cam movement and outputs the result of calculation to the output axis 602. The positioning value output for the reciprocating cam movement is transferred to the output module connected next to the output axis to drive the servo motor.

The way of calculating the positioning value output for reciprocating cam movement, which is included in the black box as functions (procedures), will now be described with reference to the flowcharts in FIGS. 10 and 11. In FIG. 10, the position address x of the input axis and the position address z of the auxiliary input axis are first imported (S1600), and the sum thereof is then converted into the position address within one revolution (S1601). The position address within one revolution is represented by a remainder which is obtained by dividing the sum of the position address of the input axis and the position address of the auxiliary input axis by a one-revolution value (360°). The value thus found is the rotation position information of the virtual cam shaft. Subsequently, the cam movement value corresponding to the rotation position information is found with reference to the cam geometry data table (S1602). The details of this procedure are shown in FIG. 11.

In FIG. 11, the position addresses within one revolution of the virtual cam shaft A1 and A2, which satisfy the relationship A1≦A<A2 as to the rotation position information A of the virtual cam shaft, are first retrieved from the cam geometry data table in FIG. 8 (S1610). Then the cam movement values corresponding to the position addresses within one revolution A1 and A2 are obtained from the cam geometry data table in FIG. 8 and are defined as D1 and D2 (S1611). The cam movement value D corresponding to the rotation position information A of the virtual cam shaft is calculated from the position addresses within one revolution A1 and A2 and the cam movement values D1 and D2 by the following expression (S1612):

$$D=D1+(D2-D1)\times\{(A-A1)/(A2-A1)\}$$

This expression makes a proportional distribution calculation on the basis of the position addresses within one revolution since the cam movement values stored in the cam geometry data table have discrete values with respect to the position addresses within one revolution of the virtual cam shaft.

From the cam movement value D corresponding to the rotation position information of the virtual cam shaft found in the procedure shown in FIG. 11 and the stroke set value h stored beforehand in the variable area, the positioning value for continuous reciprocating cam movement is calculated by the following expression (S1603 in FIG. 10):

$$(h\times D)$$

This corresponds to a reciprocating motion of the cam between the minimum limit position −h and maximum limit position h. The positioning value found is output to the output axis (S1604) and transferred to the output module connected next to the output axis to drive the servo motor.

The cam geometry data table stores the sine curve indicated by 608 in FIG. 9 for a first virtual cam module, which calculates the positioning value for the reciprocating cam movement, and the 90° out-of-phase cosine curve indicated by 609 in FIG. 9 for a second virtual cam module. Hence, if the output module connected to the first virtual cam module is an output axis which operates in a horizontal direction and the output module connected to the second virtual cam module is an output axis which operates in a vertical direction relative to said output axis that operates in a horizontal direction, for example, the positioning value of the first virtual cam module is 0 and that the second virtual cam module is plus maximum at the position address 0° shown in FIG. 9, the positioning value of the first virtual cam module is plus maximum and that of the second virtual cam module is 0° at the position address of 90°, and the modules perform reciprocating motions in accordance with the sine and cosine curves in the horizontal and vertical directions, respectively, whereby said first virtual cam module and second virtual cam module are moved jointly to perform circular motions.

Embodiment 3

From the cam movement value D corresponding to the rotation position information of the virtual cam shaft found in the procedure shown in FIG. 11 in Embodiment 2 and the stroke set value h stored beforehand in the variable area, the positioning value for continuous reciprocating cam movement is calculated by the following expression (S1603 in FIG. 10):

$$(h\times D)$$

Hence, the first virtual cam module and second virtual cam module import in real time the incremented or decremented stroke set values (arc radius designation) h identified by 614 in FIG. 12 and perform arithmetic processing in real time during the circular motions to carry out smoothly continuous spiral motions.

Embodiment 4

Figures 13, 14:
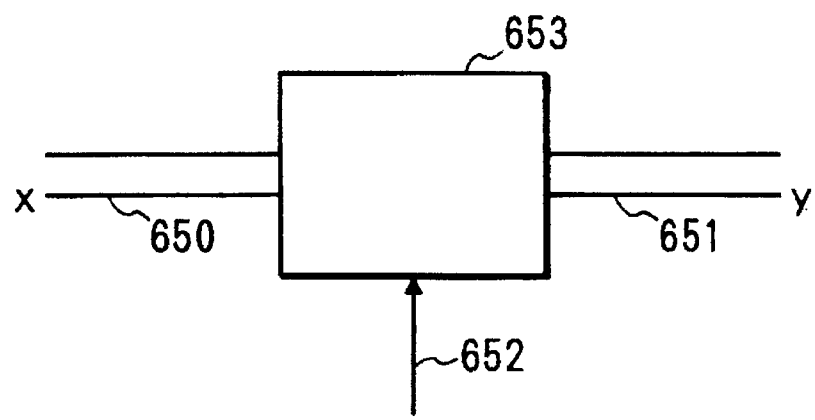
FIG. 13 is a block diagram illustrating a virtual cam module of a positioning apparatus according to an embodiment of the invention.
FIG. 14 is a memory map illustrating how cam geometry data tables of the virtual cam module of the positioning apparatus according to an embodiment of the invention are stored in a memory.

Another embodiment of the virtual cam module will now be described in accordance with FIGS. 13 to 15. FIG. 13 shows the virtual cam module, wherein 650 indicates an input axis, 651 designates an output axis, 652 represents a used cam geometry data table number, and 653 denotes a black box which contains a function (procedure).

FIG. 14 is a memory map showing how cam geometry data tables are stored into the program memory, wherein 654 indicates position addresses within one revolution of the virtual cam shaft, and 655 and 656 represent movement values of a cam corresponding to the position addresses. The position addresses within one revolution of the virtual cam shaft are angles equally spaced in one revolution.

Figure 15:
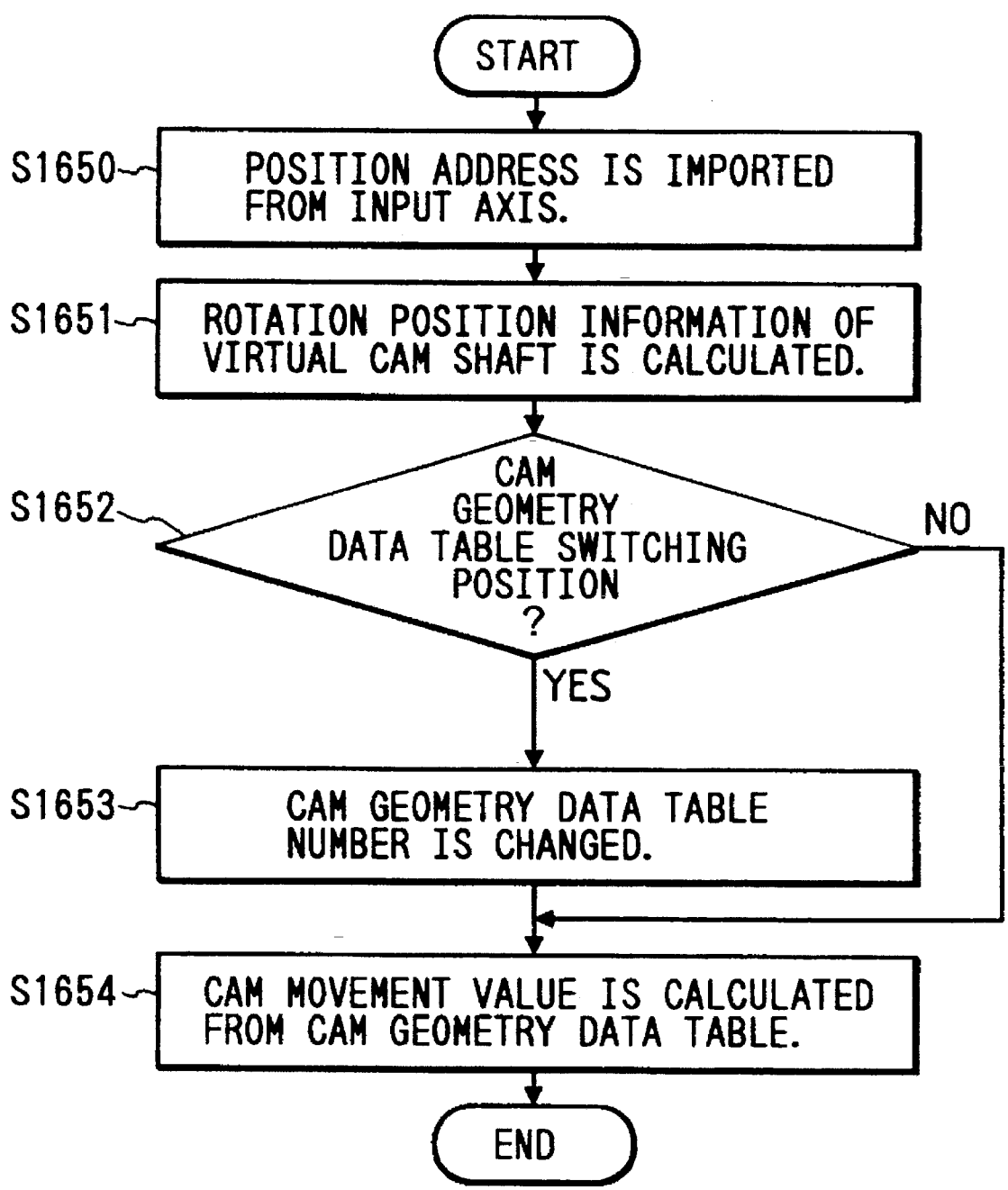
FIG. 15 is a flowchart illustrating a function included in the virtual cam module of the positioning module according to an embodiment of the invention.

FIG. 15 is a flowchart which represents the function (procedure) included in the black box 653.

Operation will now be described. The virtual cam module shown in FIG. 13 has the position address of the input axis 650 as an input. A position address from a drive software module is entered into the input axis 650 as the rotation position information of the virtual cam shaft. From that input and the cam geometry data tables stored in the program memory 9 as shown in FIG. 14, the virtual cam module calculates a positioning value of cam movement and outputs the result of calculation to the output axis 651. The positioning value output for cam movement is transferred to an output module connected next to the output axis to drive the servo motor.

The way of calculating the positioning value output for cam movement, which is included in the black box 653 as the function, will now be described with reference to the flowchart in FIG. 15. In FIG. 15, the position address x of the input axis 650 is first imported (S1650) and converted into the address within one revolution of the virtual cam shaft (S1651). The position address within one revolution of the virtual cam shaft is represented by a remainder which is obtained by dividing the position address of the input axis by a one-revolution value. It is to be understood that the one-revolution value of the virtual cam shaft is equivalent to one cycle of the cam geometry data table. The value thus found is the rotation position information of the virtual cam shaft. Then, it is judged whether or not the rotation position information of the virtual cam shaft has reached a cam geometry data table switching position (S1652). The cam geometry data table switching position, which is stored beforehand in the program memory, is the value of 0 to −1 (a one-revolution value of the virtual cam shaft). Subsequently, when the position address within one revolution of the virtual cam shaft has passed the cam geometry data table switching position in an incrementing or decrementing direction, the used cam geometry data table number 652 is switched to a specified value (S1653), and hereafter, the movement value of the cam corresponding to the rotation position information is found with reference to the cam geometry data table specified by the used cam geometry data table number 652 (S1654).

While two cam geometry data tables are employed in this embodiment there actually may be three or more tables used.

Embodiment 5

Figure 16:
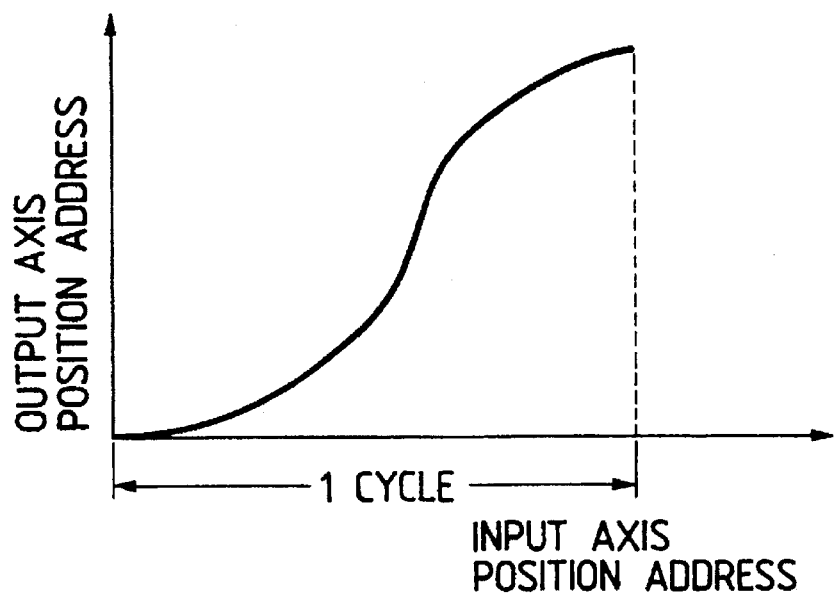
FIG. 16 is a diagram illustrating a graphed cam geometry data table of a virtual cam module of a positioning apparatus according to an embodiment of the invention.

Another embodiment of the virtual cam module will now be described in accordance with FIGS. 16 to 20. FIG. 16 shows an example of a graphed cam geometry data table, wherein a horizontal axis indicates the position address of an input axis and a vertical axis indicates that of an output axis.

Figure 17:
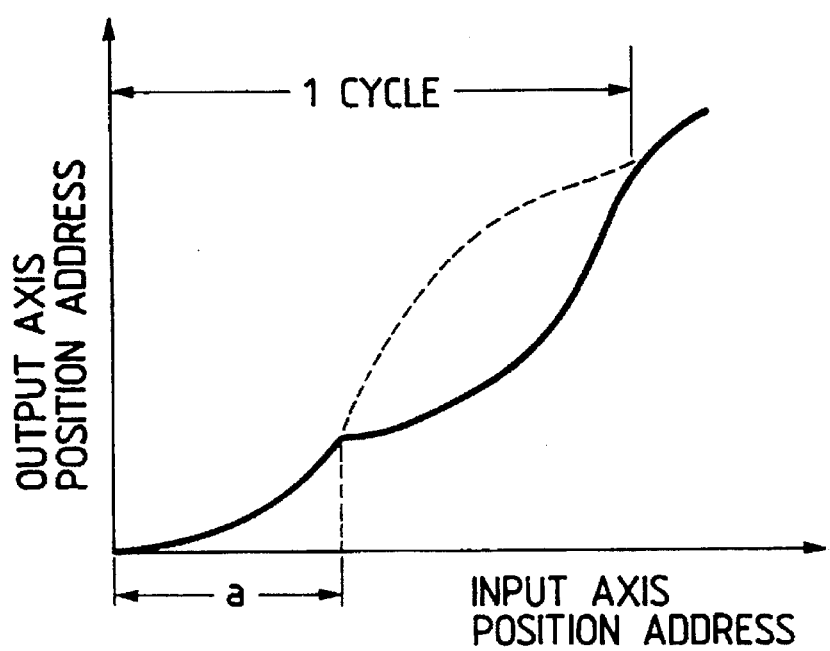
FIG. 17 is a diagram illustrating the operation of the virtual cam module of the positioning apparatus according to an embodiment of the invention.

FIG. 17 shows the operation of the present embodiment. This drawing shows how the operation is restarted from the beginning of one cycle of the cam geometry data table while one cycle of the cam geometry data table is being executed.

Figure 18:
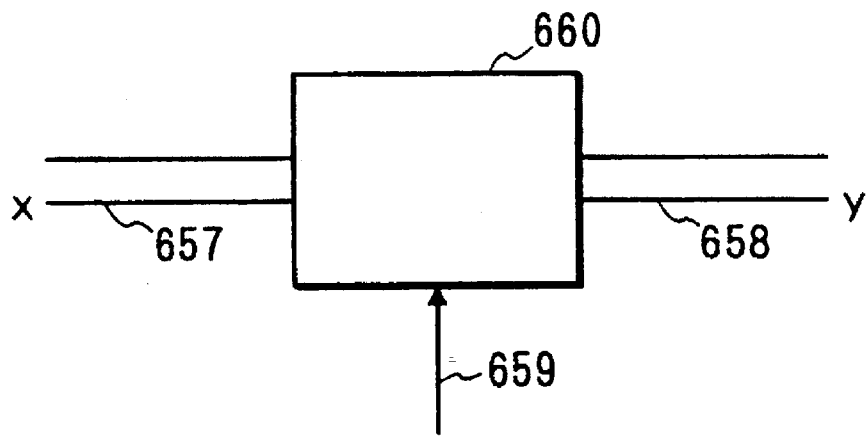
FIG. 18 is a block diagram illustrating the virtual cam module of the positioning apparatus according to an embodiment of the invention.

FIG. 18 shows the virtual cam module, wherein 657 indicates an input axis, 658 designates an output axis, 659 represents a virtual cam shaft within-one-revolution current value reset signal, and 660 denotes a black box which contains functions (procedures).

Figure 19:
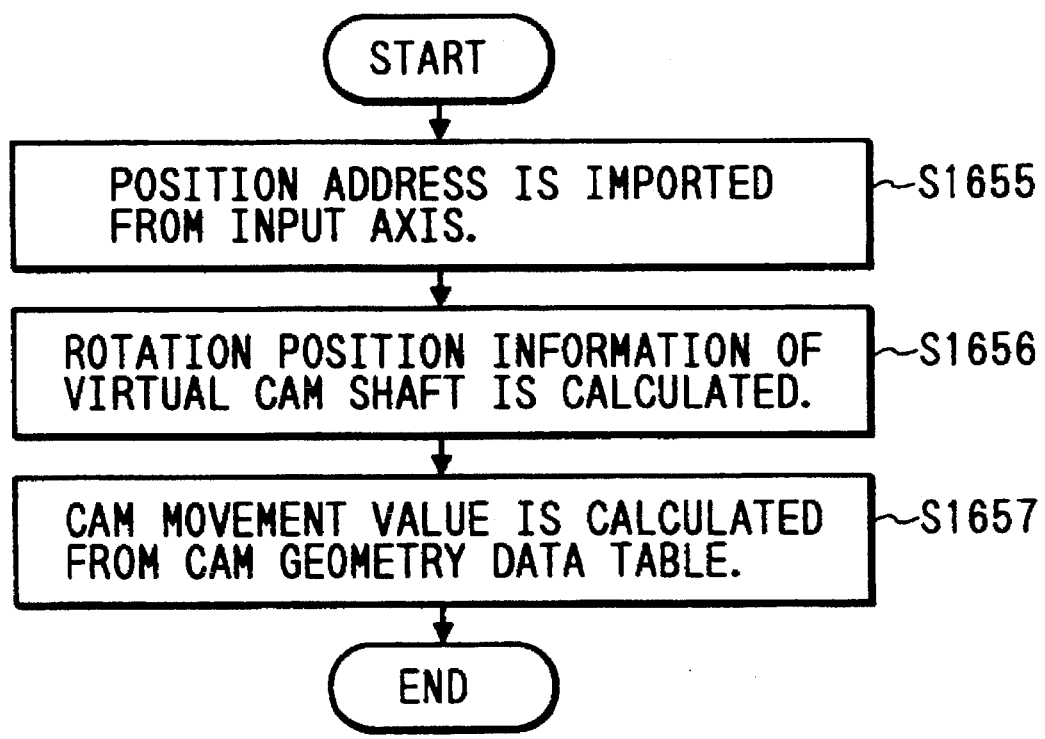
FIG. 19 is a flowchart illustrating a function in the virtual cam module of the positioning module according to an embodiment of the invention.
Figure 20:
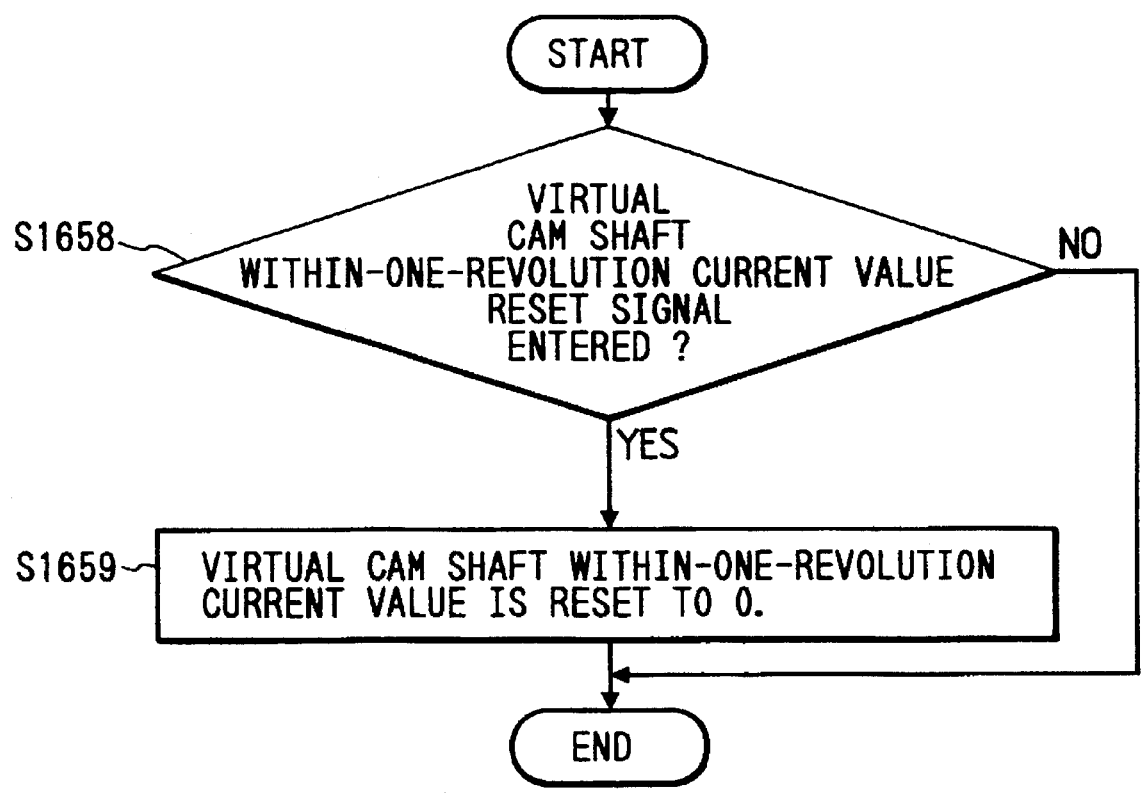
FIG. 20 is a flowchart illustrating a function included in the virtual cam module of the positioning module according to an embodiment of the invention.

FIGS. 19 and 20 are flowcharts which represent the functions (procedures) included in the black box 660.

Operation will now be described. The virtual cam module shown in FIG. 18 has the position address of the input axis 657 as an input. A position address from a drive software module is entered into the input axis 657 as the rotation position information of the virtual cam shaft. From this input and the cam geometry data table stored in the program memory as shown in FIG. 14 with respect to Embodiment 4, the virtual cam module calculates a positioning value for cam movement and outputs the result of that calculation to the output axis 658. The positioning value output for cam movement is transferred to the output module connected next to the output axis to drive the servo motor.

The way of calculating the positioning value output for cam movement, which is included in the black box 660 as its functions, will now be described with reference to the flowcharts in FIGS. 19 and 20. In FIG. 19, the position address x of the input axis 657 is first imported (S1656) and converted into the address within one revolution of the virtual cam shaft (S1656). The position address within one revolution of the virtual cam shaft is represented by a remainder which is obtained by dividing the position address of the input axis by a one-revolution value. The value thus found is the rotation position information of the virtual cam shaft. Then, the cam movement value corresponding to the rotation position information is found with reference to the cam geometry data table (S1657).

In FIG. 20, how the reference operation is restarted from the beginning of one cycle of the cam geometry data table before the completion of one cycle of the cam geometry data table will be described. First, it is judged whether or not the virtual cam shaft within-one-revolution current value reset signal 659 in FIG. 18 has been entered (S1658). If it has been entered, the current value within one revolution of the virtual cam shaft is reset to 0 (S1659). It is to be noted that operation is resumed from the output axis position address which remains unchanged. As described above, after the current value within one revolution of the virtual cam has advanced to a, the reference to the cam geometry data table is restarted from the beginning of one cycle of the cam geometry data table to perform the operation of resuming the cam movement as shown in FIG. 17. It is to be understood that the within-one revolution current value reset signal 659 may either be entered from the input/output interface 16 in FIG. 1 or from the sequence controller 5 in FIG. 1.

Embodiment 6

Figure 21:
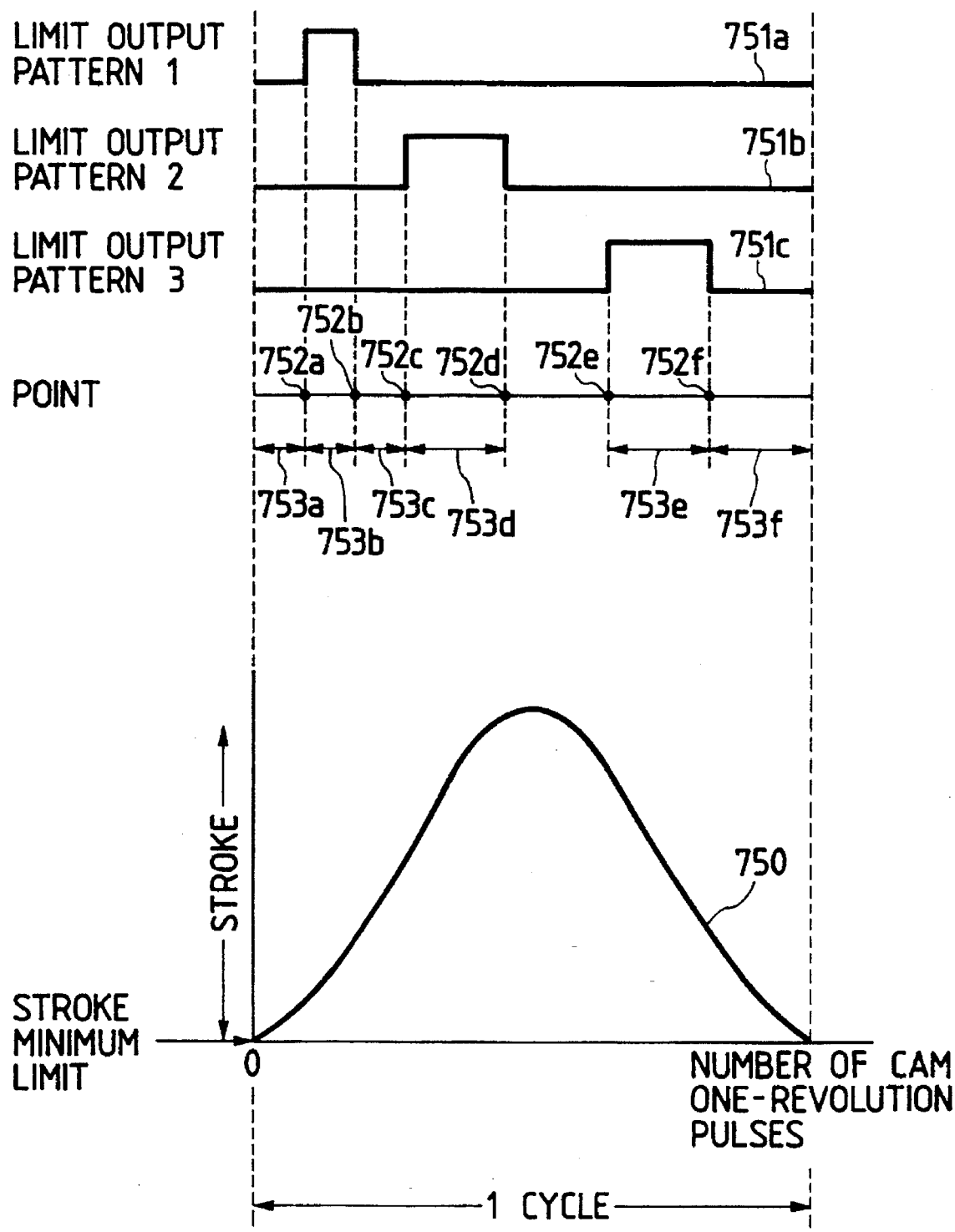
FIG. 21 is a diagram illustrating an operation example of a positioning apparatus having a limit switch output function concerned with an embodiment of the invention.

Another embodiment of the virtual transmission module will be described. FIG. 21 shows the operation of this embodiment. In this drawing, 750 indicates a cam pattern, 751a, 751b and 751c represent limit output patterns, 752a denotes point 1 or the limit output ON point of output pattern 1, 752b designates point 2 or the limit output OFF point of output pattern 1, 752c indicates point 3 or the limit output ON point of output pattern 2, 752d denotes point 4 or the limit output OFF point of output pattern 2, and similarly, 752e represents point n−1 or the limit output ON point of output pattern 3 and 752f designates point n or the limit output OFF point of output pattern 3, 753a indicates interval 0 from a start of one cycle of a cam to point 1, 753b designates interval 1 from point 1 of one cycle of the cam to point 2, 753c denotes interval 2 from point 2 of one cam cycle to point 3, 753d represents interval 3 from point 3 of one cam cycle to point 4, and similarly, 753e indicates interval n−1 from point n−1 of one cam cycle to point n, and 753f designates interval n from point n of one cam cycle to an end of one cam cycle, indicating n+1 limit output states in which ON and OFF signals are output in response to one cycle of the cam.

FIG. 22 is a memory map showing how limit switch output information is stored. 754 indicates a use/non-use set value area for determining whether limit output processing is used or not, 755 denotes an operation mode setting area for determining whether a limit switch output is provided in accordance with an actual current value fed back by the servo amplifier or in accordance with a cam shaft within-one-revolution current value which specifies any point in one cycle of the cam, 756 represents a limit switch output ON/OFF point address setting area wherein memory 757 stores the starting address 0 of the virtual cam shaft within-one-revolution current value and memory 759 stores the number of pulses required for the cam to turn one revolution, i.e., given that the value of the final address of the virtual cam shaft within-one-revolution current value is +1. To memory 758, the virtual cam shaft within-one-revolution current value is set within the range of the values of the memories 757 and 759. 760 indicates an ON/OFF pattern setting area which is used to determine whether the limit switch output is turned on or off in each interval and which stores the ON/OFF pattern of each interval corresponding to the address set in the memory 756, and memory 761 stores the number of virtual cam shaft one-revolution pulses which is used to set the number of pulses required for the cam to operate one cycle.

Figure 23:
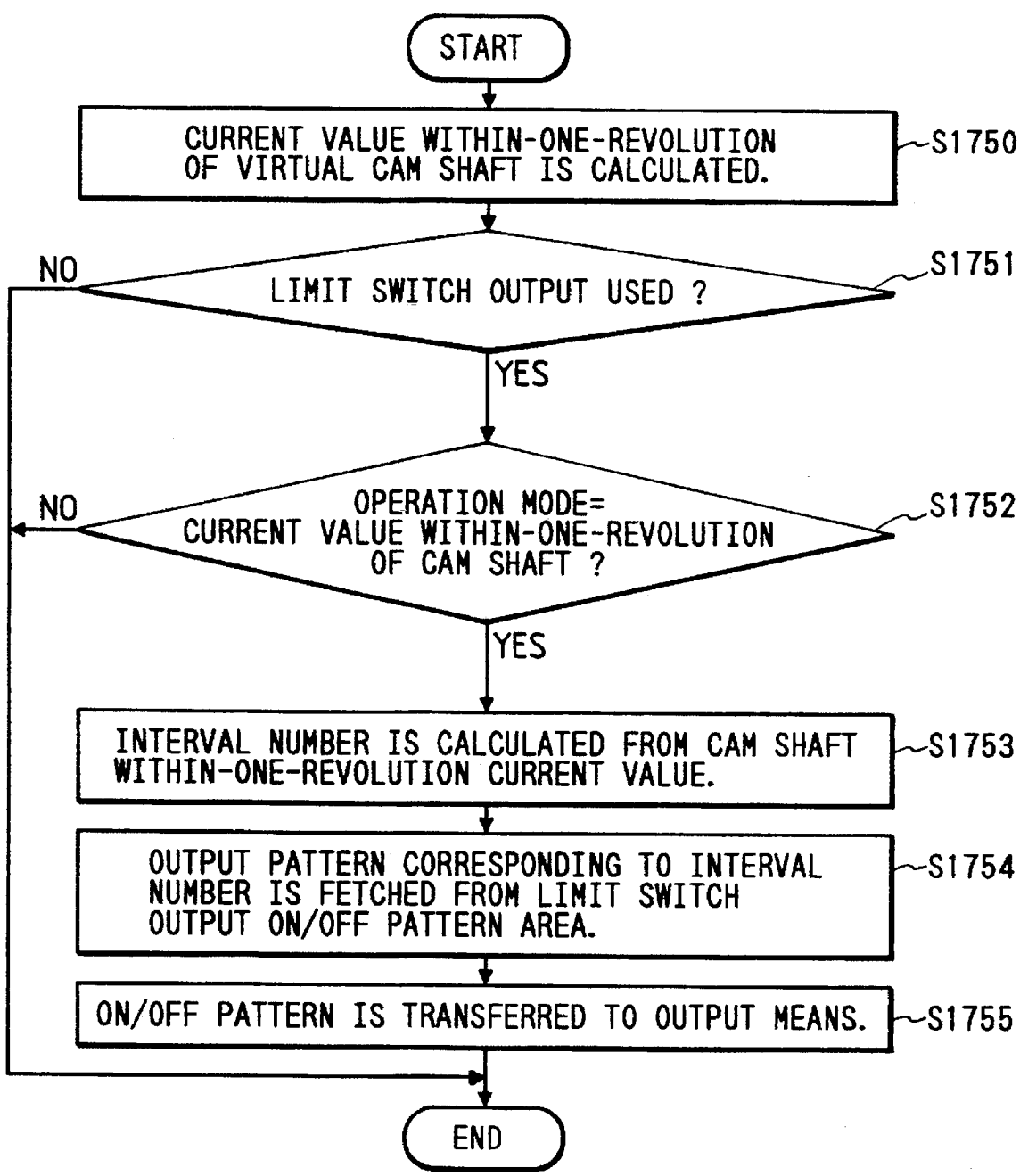
FIG. 23 is a flowchart illustrating the operation of limit switch output information processing in the positioning apparatus according to an embodiment of the invention.
Figure 24:
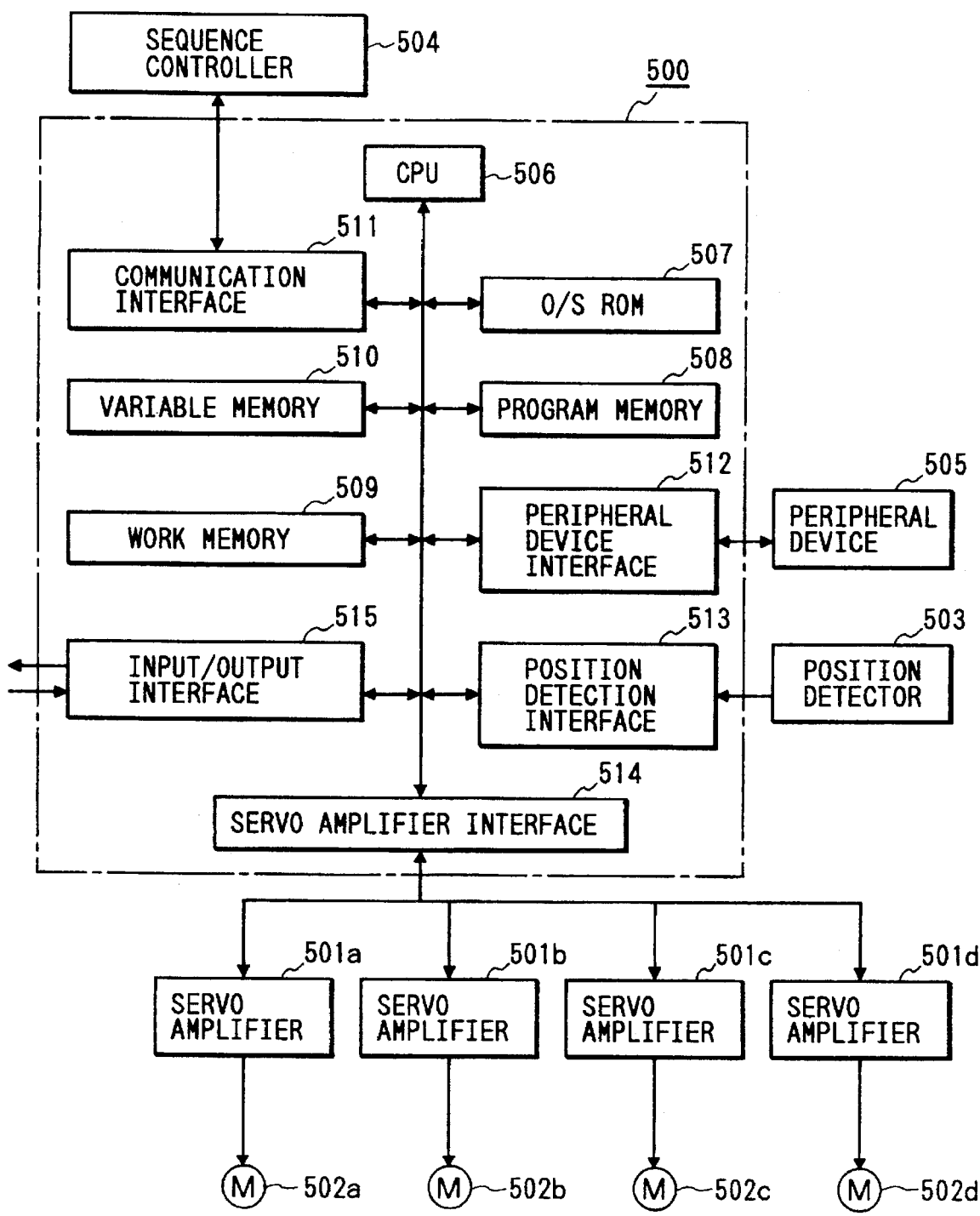
FIG. 24 is a system configuration diagram of a conventional positioning apparatus.
Figures 29, 30:
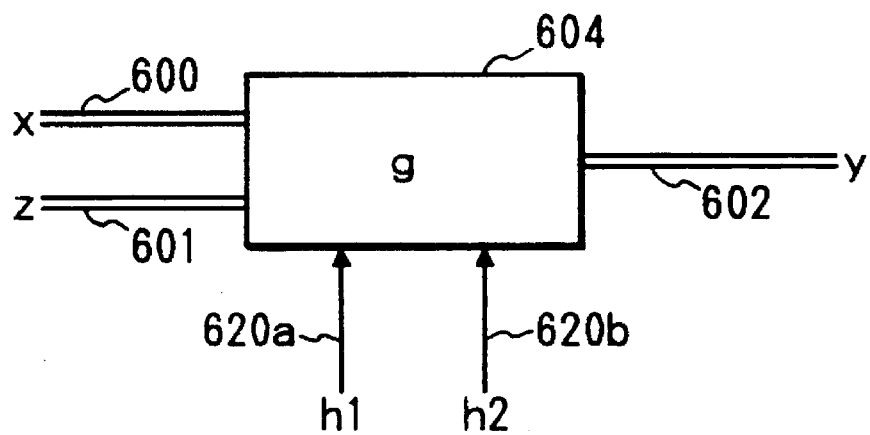
FIG. 29 is a block diagram illustrating a virtual cam module for continuous reciprocating cam movement in a second conventional art example.
FIG. 30 is a memory map illustrating how a cam geometry data table of the virtual cam module in the second conventional art example is stored in a memory.
Figure 31:
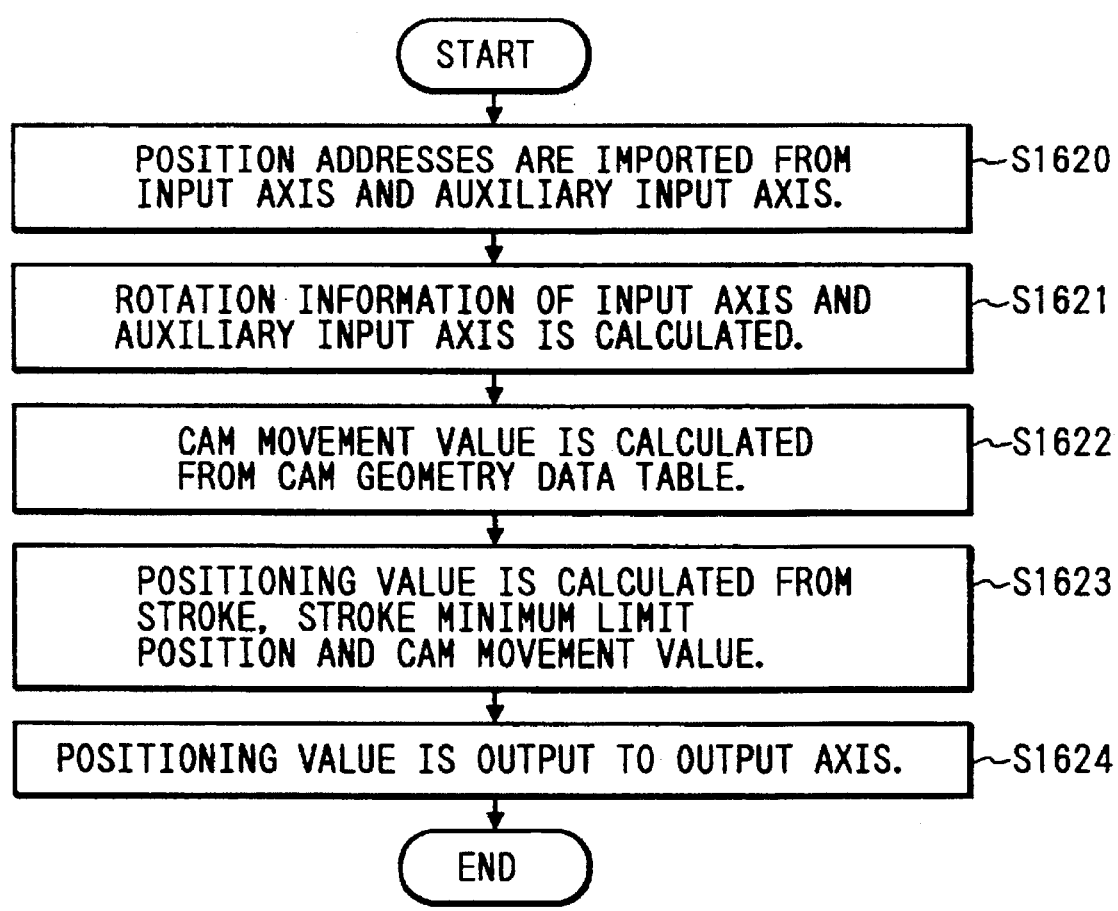
FIG. 31 is a flowchart illustrating a function included in the virtual cam module in the second conventional art example.
Figures 32, 33:
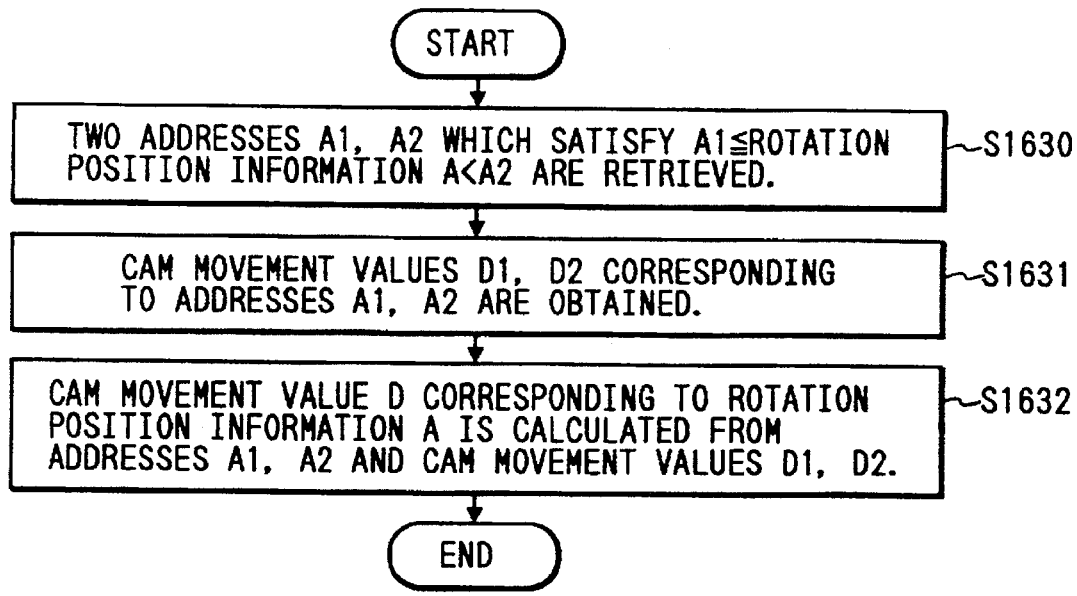
FIG. 32 is a flowchart illustrating a function included in the virtual cam module in the second conventional art example.
FIG. 33 is a memory map illustrating how the virtual cam module in the second conventional art example is stored in a memory.
Figures 34, 35:
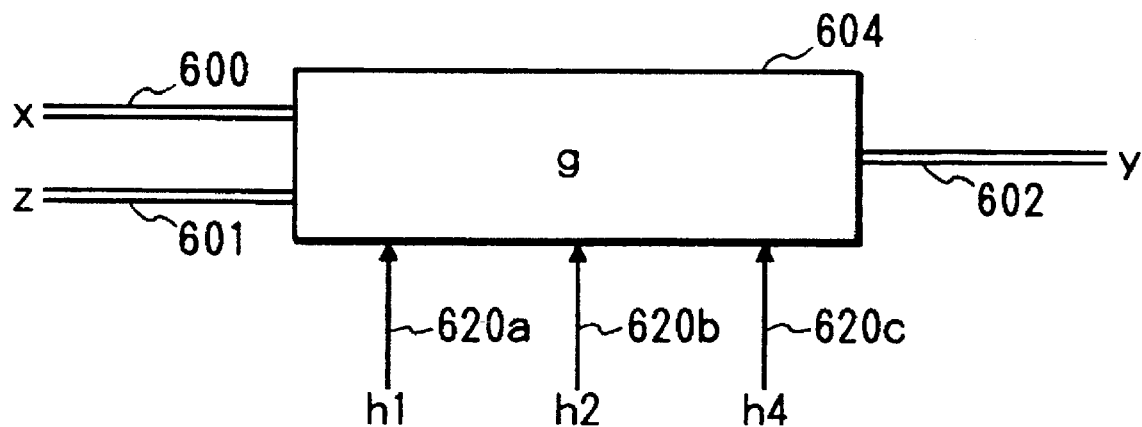
FIG. 34 is a block diagram illustrating a virtual cam module at a time when the stroke of cam movement is changed during the operation of the apparatus in a third conventional art example.
FIG. 35 is a memory map illustrating how a cam geometry data table of the virtual cam module in the third conventional art example is stored in a memory.
Figure 36:
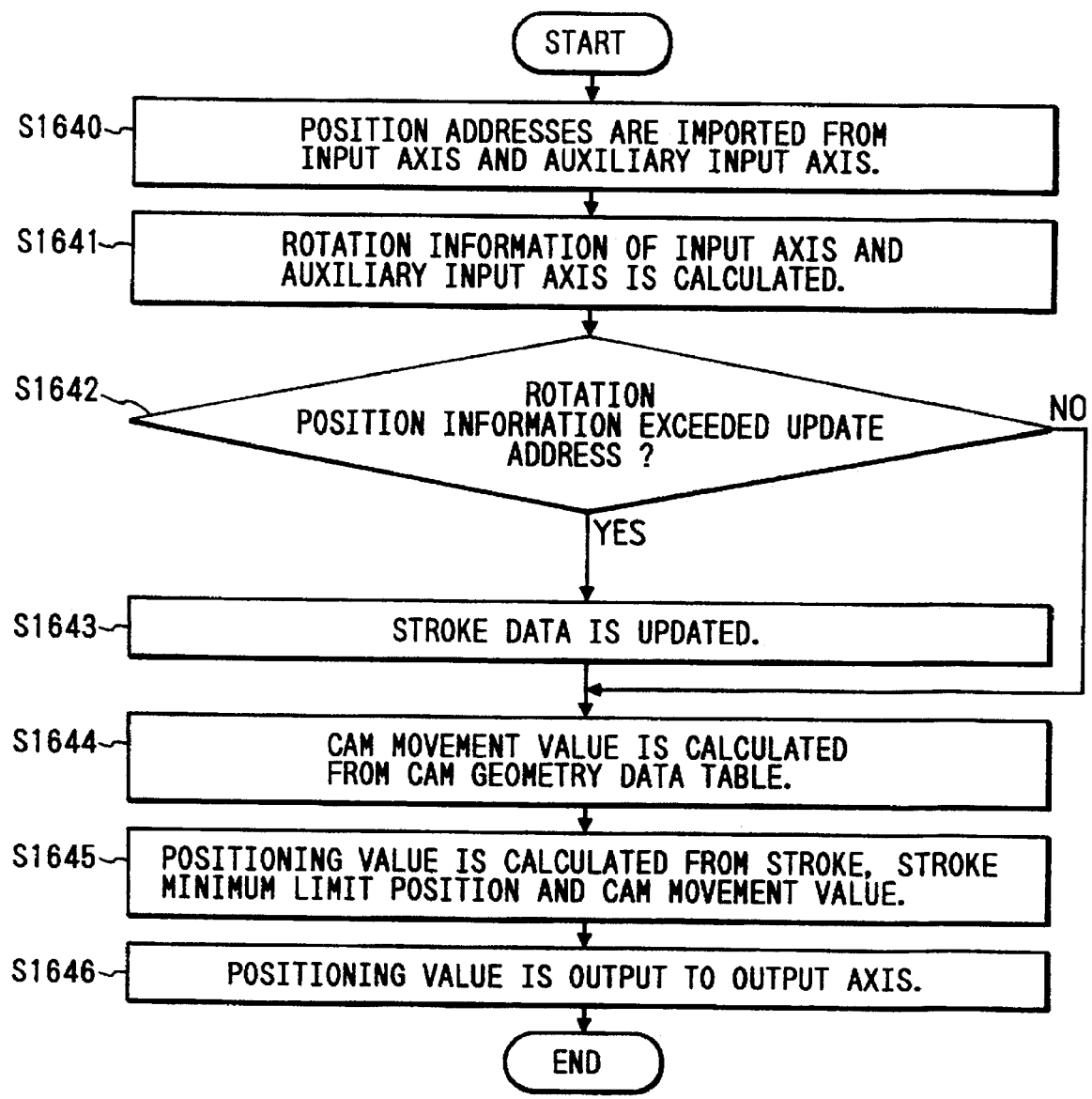
FIG. 36 is a flowchart illustrating a function included in the virtual cam module in the third conventional art example.
Figure 39:
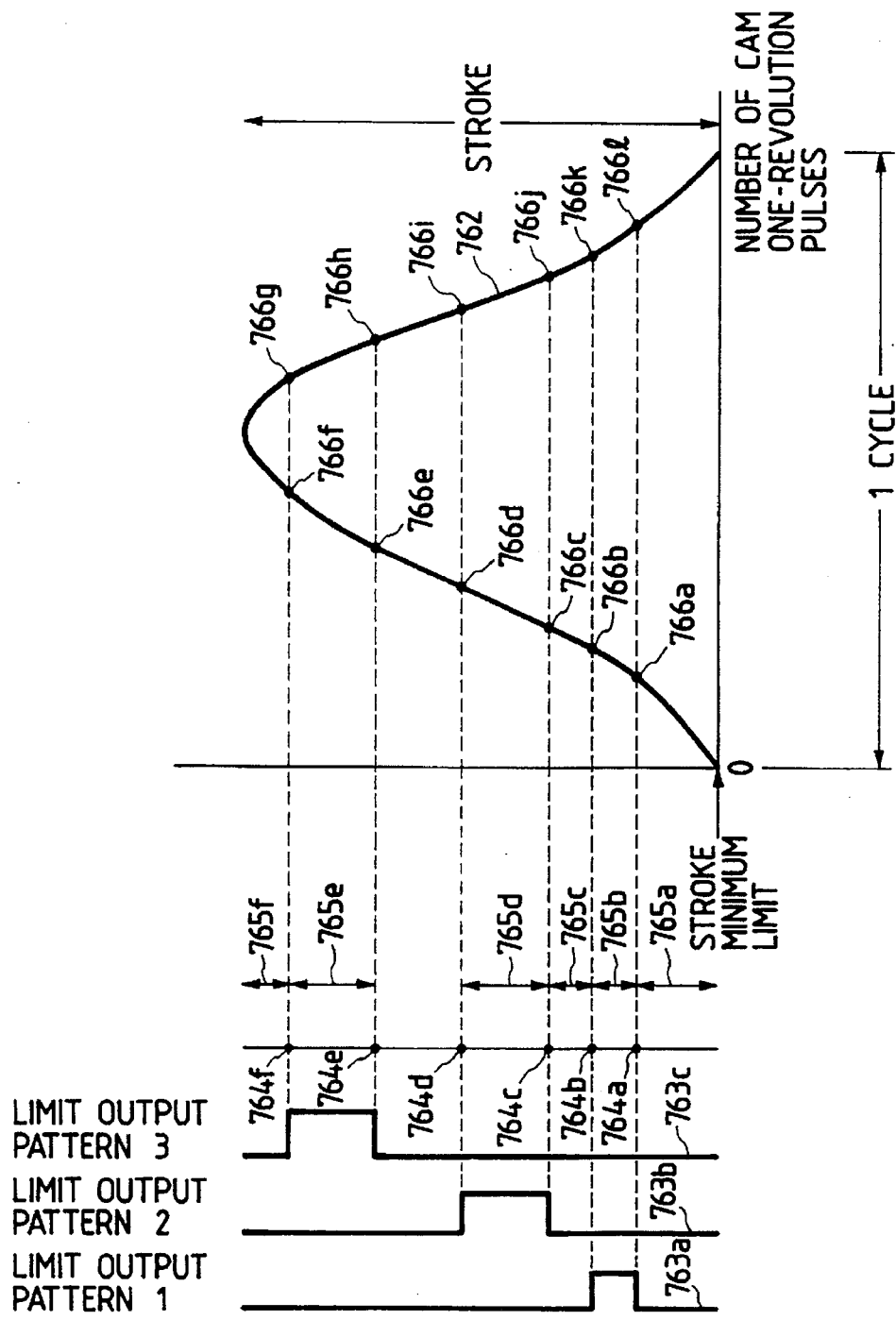
FIG. 39 is a diagram illustrating the operation example of the conventional positioning apparatus having a limit switch output function.
Figure 40:
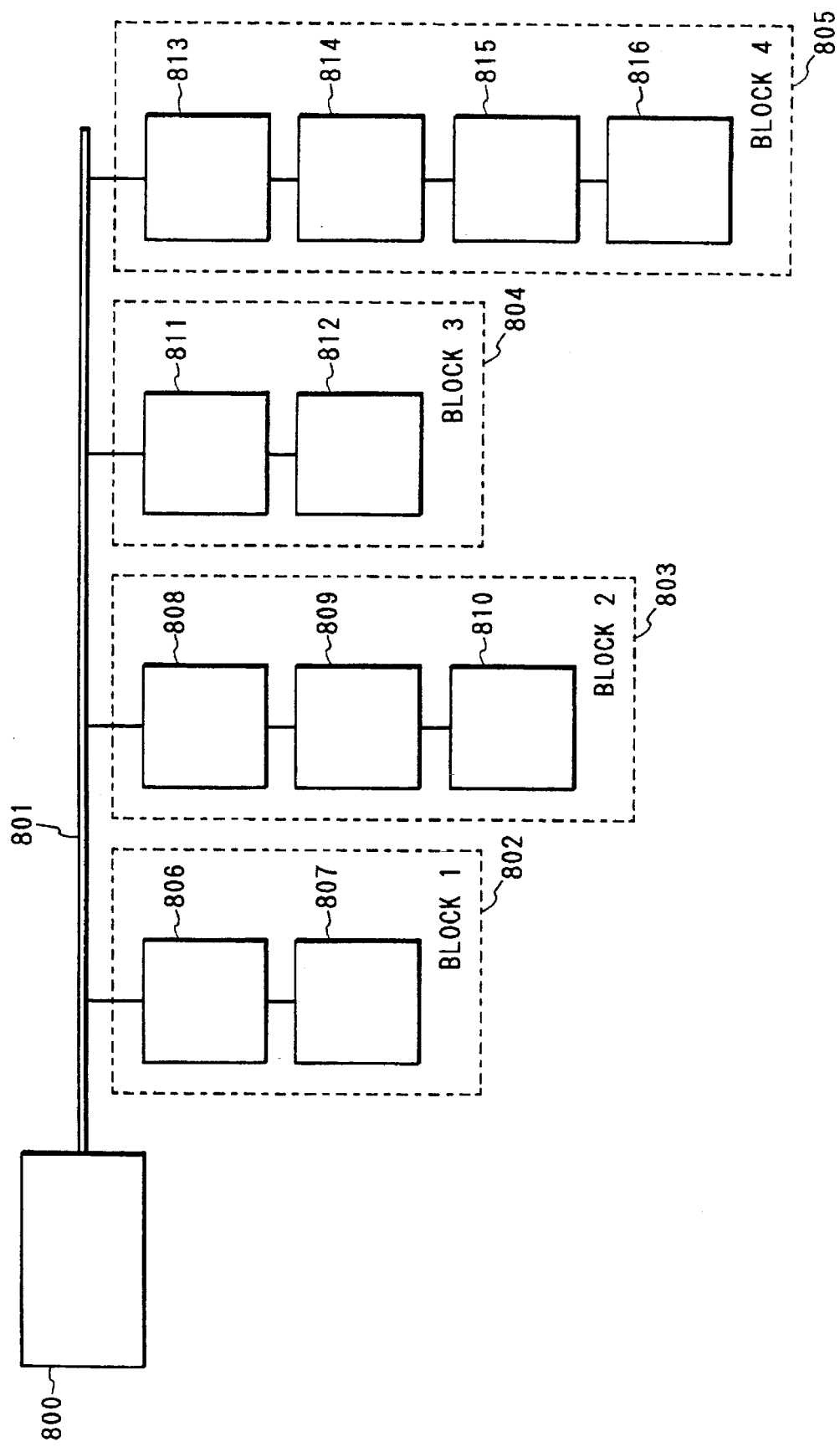
FIG. 40 is a block diagram illustrating a combination example of conventional program modules which output position information.

Operation will now be described in accordance with a flowchart shown in FIG. 23. This sequence of processing is repeated at intervals of given time by real-time interruption. At step S1750, the position information of the input axis is divided by the value set in the virtual cam shaft one-revolution pulse count area 761 and a remainder thereof is calculated as the current value within one revolution of the virtual cam shaft. At step S1751, the limit switch output use/non-use area 754 is read to judge whether the limit switch output has been set for use or non-use. If it has been set for use, the next step S1752 is executed. If it has been set for non-use, the processing is terminated. At step S1752, the operation mode area 755 is read to judge whether the operation is in a the mode in accordance with cam shaft within-one-revolution current value mode or not. If so, the execution proceeds to the next processing step S1753. If the operation is not in the cam shaft within-one-revolution current value mode, the processing is terminated.

At step S1753, the ON/OFF point area 756 is read on the basis of the cam shaft within-one-revolution current value read at step S1750 to calculate the corresponding current interval number. At step S1754, the output pattern corresponding to the interval number calculated at step S1753 is fetched from the ON/OFF pattern are 757. At step S1755, the ON/OFF pattern fetched at step S1755 is transferred to the output means, and this flowchart is then terminated.

As described above, the present invention provides a positioning apparatus which allows the ON and OFF command addresses of a virtual clutch module to be commanded with one-cycle addresses corresponding to one cycle of positioning operation, i.e. addresses within one revolution of an input axis, whereby the continuous, repeated control of one cycle of positioning operation can be exercised easily without requiring the clutch ON and OFF addresses to be commanded again in a next cycle under the control of a user sequence program.

The present invention provides a positioning apparatus which allows the ON and OFF command addresses of a virtual clutch module to be commanded with one-cycle addresses corresponding to one cycle of positioning operation, i.e. addresses within one revolution of an input axis, whereby the continuous, repeated control of one cycle of positioning operation with a plurality of axes synchronized can be exercised easily without requiring the clutch ON and OFF addresses to be re-commanded for the number of synchronized axes in a next cycle under the control of a user sequence program.

The present invention provides a positioning apparatus which allows a first virtual cam module and a second virtual cam module to perform circular movements as a single joint-motion operation, whereby radius designation can be changed without stopping motors.

The present invention further provides a positioning apparatus which allows the first virtual cam module and second virtual cam module to perform smoothly continuous spiral movements as a single joint-motion operation.

The present invention provides a positioning apparatus which allows the pattern of cam movement to be changed easily during the operation of the apparatus, whereby a servo motor need not be stopped each time the operation pattern of the servo motor is changed during operation, reducing tact time.

The present invention provides a positioning apparatus which allows one cycle of cam pattern to be resumed from its beginning after said one cycle of cam pattern has been partially completed, whereby a position within one cycle of a cam can be easily compensated for in relation to a workpiece, for example, to match the cam movement with the workpiece.

The present invention provides a positioning apparatus which allows limit switch outputs to be changed as appropriate during one cycle of cam reciprocation, whereby the limit switch outputs can be changed in given patterns during one cycle of the cam, independently of the cam pattern and stroke, to easily control the outside in synchronization with the operation of a cam shaft.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A positioning apparatus responsive to input information generated by a position detector, comprising:

a plurality of motors;

a plurality of driving sections, serially coupled to respective said motors, for driving a corresponding one of said motors;

arithmetic operation means for providing arithmetic processing;

a virtual drive software module responsive to the input information indicating a rotary position and operative in combination with said arithmetic operation means for generating and outputting reference position information; and a plurality of transmission software modules respectively coupling said virtual drive software module to said driving sections, each transmission software module comprising:

a predetermined number of transmission software functions for performing a predetermined operation on the basis of said reference position information and execution of said predetermined number of transmission software functions by the arithmetic operation means, and for outputting a result of the predetermined operation to the corresponding drive section; and at least one of the transmission software modules comprises:

converting means for converting said input information into a within-one-revolution address, said within-one-revolution address indicating a rotary position indicated by said input information within a single revolution; and transmitting means for changing an output value in accordance with a change in the within-one-revolution address from a point when a current value of the within-one-revolution address equals a preset first address, and for interrupting the changing function when said current value of the within-one revolution address equals a preset second address, whereby the positioning apparatus allows a plurality of controlled objects to be driven in synchronism with each other by said motors.

2. A positioning apparatus responsive to input information generated by a position detector, comprising:

a plurality of motors;

a plurality of driving sections, respectively dedicated to said motors, for driving a corresponding one of said motors;

arithmetic operation means for providing arithmetic processing;

a virtual drive software module responsive to the input information indicating a rotary position and operative in combination with said arithmetic operation means for generating and outputting reference position information; and a plurality of transmission software modules respectively coupling said virtual drive software module to said driving sections, each transmission software module comprising:

a predetermined number of transmission software functions, for performing a predetermined operation on the basis of said reference position information and execution of said predetermined number of transmission software functions by the arithmetic operation means, and for outputting a result of the predetermined operation to the corresponding drive section; and at least one of the transmission software modules comprises:

first storage means for storing a first table value for each of a plurality of predetermined values of said input information;

first output means for obtaining a first table value corresponding to a current value of the input information from said first table, and outputting first output information, said first output information being a function of said obtained first table value;

second storage means for storing a second table value for each of said predetermined values of said input information, wherein said second table values are shifted by 90° with respect to said first table values; and second output means for obtaining the second table value corresponding to a current value of a within-one-revolution address from said second table, and outputting second output information, said second output information being a function of the obtained second table value, whereby the positioning apparatus allows a plurality of controlled objects to be positioned in synchronism with each other by said motors.

3. The positioning apparatus according to claim 2, wherein any one of the transmission software modules further comprises:

converting means for converting said input information into a within-one-revolution address, said within-one-revolution address indicating a rotary position of revolution indicated by said input information within a single revolution; and output information generating means having a storage area for storing a predetermined number of pairs of information, and generating a predetermined number of output information on the basis of a content of the storage area, each pair of information consisting of a first value representing the within-one-revolution address of said input information and a second value which is shifted by 90 degrees with respect to said first value, wherein the input information indicating the position of revolution is an input to the converting means.

4. The positioning apparatus according to claim 2, wherein said first and second output means output results obtained by multiplying the first and second output information by time varying constants, respectively.

5. The positioning apparatus according to claim 4, wherein any one of the transmission software modules further comprises:

converting means for converting said input information into a within-one-revolution address, said within-one-revolution address indicating a rotary position of revolution indicated by said input information within a single revolution; and output information generating means having a storage area for storing a predetermined number of pairs of information, and generating a predetermined number of output information on the basis of a content of the storage area, each pair of information consisting of a first value representing the within-one-revolution address of said input information and a second value which is shifted by 90 degrees with respect to said first value, wherein the input information indicating the position of revolution is an input to the converting means.

6. A positioning apparatus responsive to input information indicative of rotary position derived from a position detector, comprising:

a plurality of motors;

a plurality of driving sections, serially coupled to respective said motors, for driving a corresponding one of said motors;

arithmetic operation means for providing arithmetic processing;

a virtual drive software module responsive to the input information and operative in combination with said arithmetic operation means for generating and outputting reference position information; and a plurality of transmission software modules respectively coupling said virtual drive software module to said driving sections, each transmission software module comprising:

a predetermined number of transmission software functions for performing a predetermined operation on the basis of said reference position information and execution of said predetermined number of transmission software functions by the arithmetic operation means, and for outputting a result of the predetermined operation to the corresponding drive section; and at least one of the transmission software modules comprises:

(i) first and second storage means for storing a first and a second table value, respectively, for each of a plurality of predetermined values of said input information, (ii) first output means for obtaining a first table value corresponding to a current value of the input information from the first storage means, and outputting first output information, said first output information being a function of the obtained first table value, and (iii) second output means for obtaining a second table value corresponding to the current value of the input information from the second storage means upon coincidence of a present value with the current value of the input information, and outputting second output information, said second output information being a function of the second obtained second table value, whereby the positioning apparatus allows a plurality of controlled objects to be positioned in synchronism with each other by said motors.

7. The positioning apparatus according to claim 6, wherein any one of the transmission software modules further comprises:

converting means for converting said input information into a within-one-revolution address, said within-one-revolution address indicating a rotary position of revolution said input information within a single revolution; and output information generating means having a storage area for storing a predetermined number of pairs of information, and generating a predetermined number of output information on the basis of a content of the storage area, each pair of information consisting of a first value representing the within-one-revolution address of said input information and a second value which is shifted by 90 degrees with respect to said first value, wherein the input information indicating the position of revolution is an input to the converting means.

8. A positioning apparatus responsive to input information indicative of rotary position derived from a position detector, comprising:

a plurality of motors;

a plurality of driving sections, serially coupled to respective said motors, for driving a corresponding one of said motors;

an arithmetic operation means for providing arithmetic processing;

a virtual drive software module responsive to the input information and operative in combination with said arithmetic operation means for generating and outputting reference position information; and a plurality of transmission software modules respectively coupling said virtual drive software module to said driving sections, each transmission software module comprising:
- a predetermined number of transmission software functions, for performing a predetermined operation on the basis of said reference position information and execution of said predetermined number of transmission software functions by the arithmetic operation means, and for outputting a result of the predetermined operation to the corresponding drive section; and
- at least one of the transmission software modules comprises:
  - (i) first and second storage means for storing a first and a second table value, respectively, for each of a plurality of predetermined values of said input information,
  - (ii) first output means for obtaining a first table value corresponding to a current value of the input information from the first storage means and outputting first output information, said first output information being a function of the obtained first table value, and
  - (iii) second output means for obtaining a second table value corresponding to a value obtained by one of adding and subtracting a predetermined value to or from the current value of the input information upon coincidence of a predetermined value with the current value of the input information, and outputting second output information, said second output information being a function of the obtained second table value, whereby the positioning apparatus allows a plurality of controlled objects to be positioned in synchronism with each other by said motors.

9. The positioning apparatus according to claim 8, wherein any one of the transmission software modules further comprises:

converting means for converting said input information into a within-one-revolution address, said within-one-revolution address indicating a rotary position of revolution indicated by said input information within a single revolution; and output information generating means having a storage area for storing a predetermined number of pairs of information, and generating a predetermined output on the basis of a content of the storage area, each pair of information consisting of a first value representing the within-one-revolution address of said input information and a second value which is shifted by 90 degrees with respect to said first value, wherein the input information indicating the position of revolution is an input to the converting means.

10. A method of synchronously driving a plurality of motors with a plurality of corresponding driving sections, respectively dedicated for driving said motors, in response to position information to control a controlled object, comprising the steps of:

receiving information including input information indicating a revolution position of each of the motors;

determining reference position information for each of the motors;

repeatedly performing a predetermined operation on the basis of said reference position information for each of the motors;

converting said input information into a within-one-revolution address, said within-one-revolution address indicating a rotational position within a single revolution;

changing an output value in accordance with a change in the within-one-revolution address upon coincidence of a preset first address with a current value of the within-one-revolution address; and interrupting the changing step upon coincidence of a preset second address with said current value of the within-one-revolution address.

11. The method set forth in claim 10, wherein the said reference position information determining step further comprises setting a number of input axis one-revolution pulses to be used to convert said position information into an address within-one-revolution of an input axis.

12. The method as set forth in claim 10, wherein said changing step further comprises engaging a clutch and said interrupting step further comprises disengaging said clutch.

13. The method as set forth in claim 12 wherein ON and OFF command addresses of said clutch are commanded with one cycle addresses in plural sequential cycles.

14. The method as set forth in claim 10, wherein one cycle of a cam pattern is resumed after said one cycle of said cam pattern is partially completed, whereby a position within one cycle of a cam can be repeatedly compensated for in relation to a workpiece.

15. A method of synchronously driving a plurality of motors with a plurality of corresponding driving sections, respectively dedicated for driving the motors, in response to position information to control a controlled object, comprising the steps of:

inputting information including input information indicating a rotary position of each of the motors;

determining reference position information for each of the motors;

performing a predetermined operation on the basis of said reference position information for each of the motors;

converting said input information into a within-one-revolution address, said within-one-revolution address indicating a rotational position of said input information within a single revolution;

storing a first group of values for each of a plurality of predetermined values of said input information;

obtaining one of said first group of values corresponding to a current value of the input information, and outputting first output information, said first output information being a function of said obtained first group value;

storing a second group of values for each predetermined values of said input information wherein said second group of values are shifted by 90° with respect to said first group of values; and obtaining a value corresponding to a current value of the within-one-revolution address from said second group of values, and outputting second output information, said second output information being a function of the obtained second group value.

16. A method of synchronously driving a plurality of motors with plurality of corresponding driving sections, respectively dedicated for driving the motors, in response to position information to control a controlled object, comprising the steps of;

storing predetermined cam movement values representing predetermined rotation positions of a cam shaft in a cam geometry table, said storing step comprising the steps of:
storing values in a plurality of cam geometry tables,
selecting one of said plurality of cam geometry tables upon the occurrence of a predetermined condition, and
calculating said cam movement values on the basis of said selected cam geometry table;
inputting input position information, said input position information containing data representing rotary positions of an input cam shaft and an auxiliary input cam shaft;
calculating a rotational position of said input cam shaft and said auxiliary input cam shaft;
calculating a current cam movement value of a cam from the predetermined cam movement values;
calculating a current position value of a cam from a stroke set value and said current cam movement values; and
outputting said current position value.

17. The method as set forth in claim 16, further comprising:
selecting first and second addresses from said predetermined cam movement values on the basis of said input position information;
selecting first and second predetermined cam movement values from said predetermined cam movement values, said first and second predetermined cam movement values corresponding to said first and second addresses, wherein said current position value is a function of said first and second addresses, said first and second predetermined cam movement values, and said input position.

18. A positioning apparatus responsive to input information generated by a position detector, comprising:
a plurality of motors;
a plurality of driving sections, serially coupled to respective said motors, for driving a corresponding one of said motors;
arithmetic operation means for providing arithmetic processing;
a virtual drive software module responsive to the input information indicating a rotary position and operative in combination with said arithmetic operation means for generating and outputting reference position information; and
a plurality of transmission software modules respectively coupling said virtual drive software module to said driving sections, each transmission software module comprising:
a predetermined number of transmission software functions, for performing a predetermined operation on the basis of said reference position information and execution of said predetermined number of transmission software functions by the arithmetic operation means, and for outputting a result of the predetermined operation to the corresponding drive section; and
at least one of the transmission software modules comprises: converting means for converting said input information into a within-one-revolution address, said within-one-revolution address indicating a rotary position of revolution indicated by said input information within a single revolution;
means for calculating an interval number representing an interval of said rotary position; and
means for calculating an output pattern corresponding to said interval number,
whereby the positioning apparatus allows a plurality of controlled objects to be positioned in synchronism with each other by said motors.

19. A method of synchronously positioning a plurality of motors with a plurality of corresponding driving sections, respectively dedicated for driving the motors, in response to position information to control the position of a controlled object, comprising the steps of:
inputting information including input information indicating a rotary position of each of the motors;
determining reference position information for each of the motors;
converting said input information into a within-one-revolution address, said within-one-revolution address indicating a rotational position within a single revolution;
calculating an interval number representing an interval of said rotary position; and
calculating an output pattern corresponding to said interval number.

* * * * *